United States Patent
Matsuda

(10) Patent No.: US 7,376,430 B2
(45) Date of Patent: May 20, 2008

(54) LOCATION SYSTEM AND METHOD FOR OPERATING MOBILE TERMINAL AS A RESPONSIBLE LOCATION FOR SELECTING A POSITIONING METHOD

(75) Inventor: Jun-ichi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 677 days.

(21) Appl. No.: 10/762,541

(22) Filed: Jan. 23, 2004

(65) Prior Publication Data

US 2004/0185870 A1    Sep. 23, 2004

(30) Foreign Application Priority Data

Jan. 28, 2003    (JP) ............................. 2003-019406

(51) Int. Cl.
*H04Q 7/20* (2006.01)

(52) U.S. Cl. ................ 455/456.2; 455/456.1; 455/456.5; 455/456.6

(58) Field of Classification Search ............. 455/456.1, 455/456.2, 456.5, 456.6
See application file for complete search history.

(56) References Cited

U.S. PATENT DOCUMENTS

| | | | |
|---|---|---|---|
| 6,313,787 B1* | 11/2001 | King et al. ............. | 342/357.03 |
| 7,016,693 B2* | 3/2006 | Guyot ..................... | 455/456.2 |
| 7,054,283 B2* | 5/2006 | Carlsson et al. ......... | 370/328 |
| 7,069,023 B2* | 6/2006 | Maanoja et al. ......... | 455/456.1 |
| 2002/0077116 A1 | 6/2002 | Havinis et al. | |
| 2002/0156578 A1* | 10/2002 | Kondou et al. ............ | 701/213 |
| 2003/0013443 A1* | 1/2003 | Willars et al. ............. | 455/432 |
| 2003/0128163 A1* | 7/2003 | Mizugaki et al. ........... | 342/464 |
| 2004/0137918 A1* | 7/2004 | Varonen et al. ........... | 455/456.2 |

FOREIGN PATENT DOCUMENTS

| | | |
|---|---|---|
| WO | WO 99/46947 A1 | 3/1999 |
| WO | WO 03/005750 A1 | 6/2001 |
| WO | WO 02/03093 A1 | 7/2001 |

OTHER PUBLICATIONS

ETSI: "Universal Mobile Telecommunications System (UMTS); Radio resource Control (RRC) protocol specification (3GPP TS 25.331 version 5.2.0 Release 5)", Sep. 2002, pp.187-189, XP-002281020.
3GPP: "3rd Generation Partnership Project; Technical Specification Group Radio Access Network; Stage 2 functional specification of User Equipment (UE) position in UTRAN (Release 5)" 3GPP TS 25.304 V5.4.0, Mar. 2002, pp. 1-53, XP-002281021.
Y. Zhao, "Standardization of Mobile Phone Positioning for 3G Systems," IEEE Communications Magazine. Jul. 2002, pp. 108-116, XP-001132648.
3rd Generation Partnership Project; Technical Specification Group Radio Access Network; Stage 2 functional specification of User Equipment (UE) positioning in UTRAN (Release 5); pp. 1-53, Mar. 2002.

* cited by examiner

*Primary Examiner*—Barry Taylor
(74) *Attorney, Agent, or Firm*—Foley & Lardner LLP

(57) ABSTRACT

In a mobile communication network, a controlling node receives capability information from a mobile terminal, indicating positioning methods supported by the mobile terminal and selectability of the positioning methods. In response to a location request message from a client terminal requesting the location information of a target mobile terminal, the controlling node transmits a first control message via a wireless node to the target mobile terminal, containing a copy of requested accuracy of the location information, if the capability information indicates that the target mobile terminal is capable of selecting positioning methods. The mobile terminal performs measurement according to a positioning method that satisfies the requested accuracy. Otherwise, the controlling transmits a second control message to the mobile terminal, specifying a positioning method. In this case, the mobile terminal performs measurement according to the specified positioning method.

68 Claims, 20 Drawing Sheets

FIG. 3A

CONNECTION SETUP COMPLETE MESSAGE
(FROM UE TO RNC)

| FIELDS | CAPABILITIES SUPPORTED BY UE |
|---|---|
| 31 POSITIONING METHOD SELECTABILITY | "1" = SUPPORTED<br>"0" = NOT SUPPORTED |
| 32 UE-BASED OTDOA | "1" = SUPPORTED<br>"0" = NOT SUPPORTED |
| 33 NETWORK ASSISTED GPS | "0" = NETWORK-BASED GPS IS SUPPORTED<br>"1" = UE-BASED GPS IS SUPPORTED<br>"2" = BOTH NETWORK- AND UE-BASED GPS ARE SUPPORTED<br>"3" = NOT SUPPORTED |

FIG. 3B

LOCATION REPORTING CONTROL MESSAGE
(FROM MSC/SGSN TO RNC)

| FIELDS | ACCURACY REQUESTED BY CLIENT |
|---|---|
| 34 HORIZONTAL ACCURACY CODE | HORIZONTAL ACCURACY REQUESTED BY CLIENT |
| 35 VERTICAL ACCURACY CODE | VERTICAL ACCURACY REQUESTED BY CLIENT |
| 36 RESPONSE TIME | REQUESTED WAITING TIME TO RECEIVE LOC. REPORT |

FIG. 3C

MEASUREMENT CONTROL MESSAGE
(FROM RNC TO UE)

| FIELDS | METHOD TO BE USED |
|---|---|
| POSITIONING METHODS (37) | "0" = CELL ID SPECIFIED BY RNC<br>"1" = OTDOA SPECIFIED BY RNC<br>"2" = GPS SPECIFIED BY RNC<br>"3" = OTDOA OR GPS SPECIFIED BY RNC<br>"4" = UE IS RESPONSIBLE FOR SELECTING POSITIONING METHOD |
| HORIZONTAL ACCURACY CODE (38) | COPIED FROM LRC MESSAGE |
| VERTICAL ACCURACY CODE (39) | COPIED FROM LRC MESSAGE |
| RESPONSE TIME (40) | COPIED FROM LRC MESSAGE |

FIG. 3D

ASSISTANCE DATA REQUEST MESSAGE
(FROM UE TO RNC)

| FIELDS | METHOD SELECTED BY UE |
|---|---|
| POSITIONING METHODS (41) | "0" = RESERVED<br>"1" = OTDOA<br>"2" = GPS<br>"3" = OTDOA AND GPS |
| METHOD TYPE (42) | "0" = UE-BASED<br>"1" = UE-ASSITED |

UE

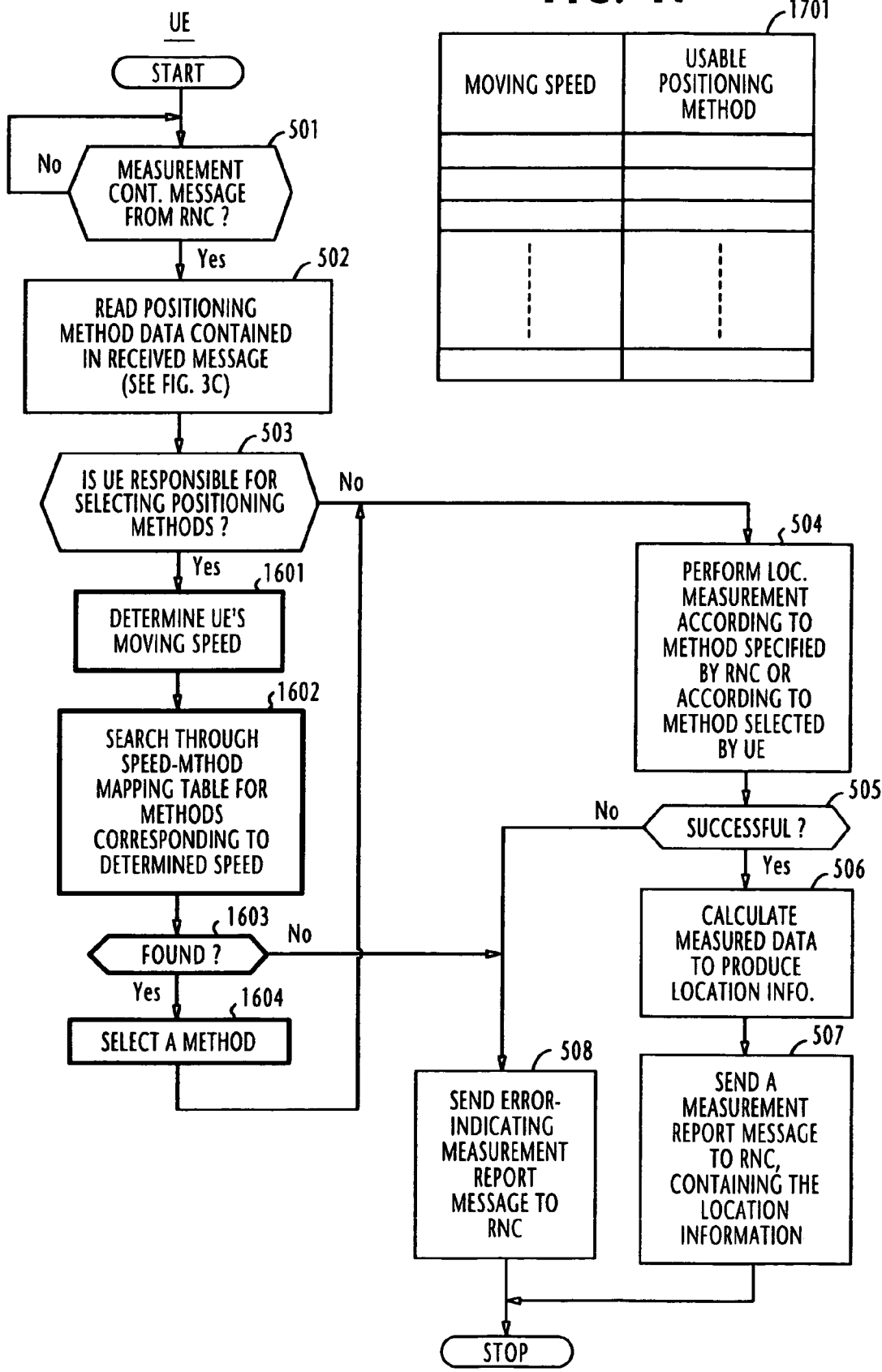

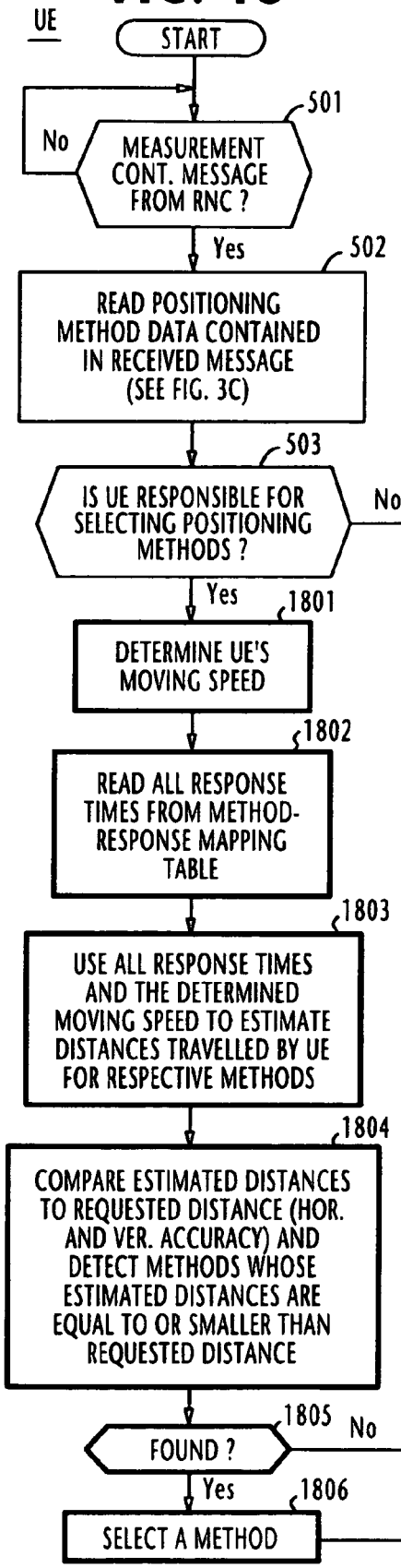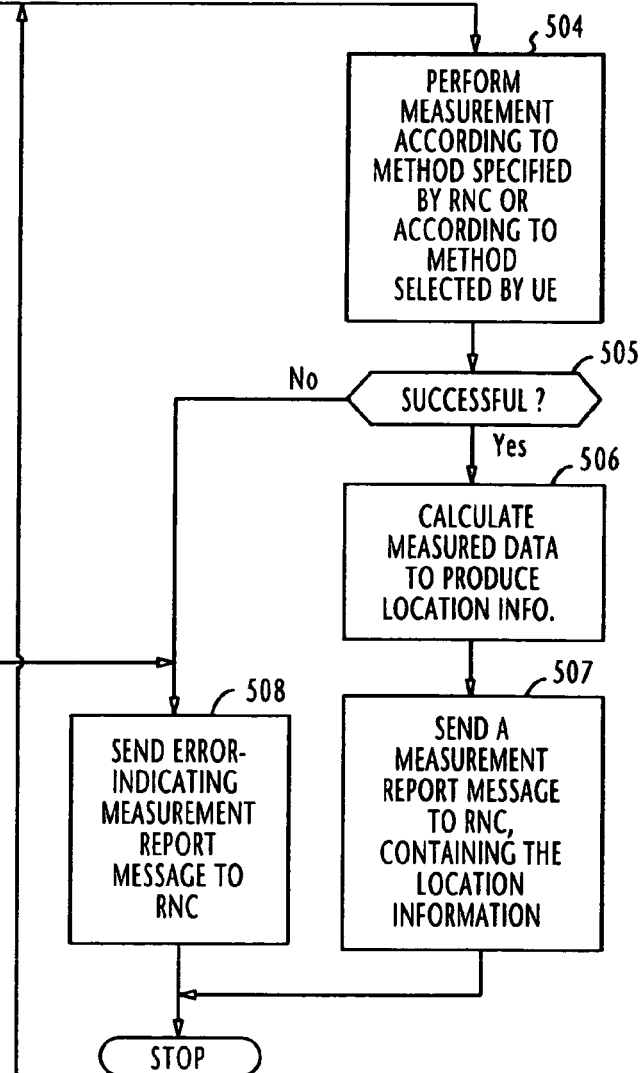

LOCATION SYSTEM AND METHOD FOR OPERATING MOBILE TERMINAL AS A RESPONSIBLE LOCATION FOR SELECTING A POSITIONING METHOD

BACKGROUND OF THE INVENTION

1. Field of the Invention

The present invention relates generally to location systems, and more specifically to a location system in which a number of positioning methods are selectively used depending on accuracy requested by a LCS (LoCation Service) client terminal.

2. Description of the Related Art

In the location system as standardized by 3GPP (3rd Generation Partnership Project) TS 25.305, a number of positioning methods are used, including Cell-ID method, OTDOA (Observed Time Difference Of Arrival), and A-GPS (network-assisted Global Positioning System). The system is made up of a core network and a W-CDMA radio access network (RAN) in which the radio network controller (RNC) is responsible for controlling a number of base stations to establish connections to mobile terminals. When a client terminal transmits a location request to the location system by specifying accuracy of the location of a target mobile terminal or UE (user equipment) terminal, the request is passed through the core network to the RNC, one of the positioning methods is selected according to the requested accuracy and/or the positioning capability of the target UE terminal to perform measurement and position calculation and returns a location report message to the client terminal.

Since all traffic to and from mobile terminals is concentrated on the RNC and the selection of a positioning method is a complex, time-consuming process, the processing burden is significant when the network is under heavy traffic load.

In addition, no consideration has been taken of other factors to select a positioning method, such as the environment of the target UE terminal. As a result, if a target mobile user is located in a place such as underground shopping areas where GPS satellites are not observable and if the RNC selects A-GPS according to the requested accuracy, the location request results in a useless traffic, unnecessarily consuming network resources.

SUMMARY OF THE INVENTION

It is therefore an object of the present invention to provide a location system and a method for operating a mobile terminal as a responsible location for selecting a positioning method.

According to a first aspect of the present invention, there is provided a location system comprising a mobile terminal including a plurality of location processors for performing measurement for locating the mobile terminal according to different positioning methods, a plurality of wireless nodes for establishing a wireless link to the mobile terminal, and a controlling node connected to the wireless nodes. The controlling node transmits a control message to the mobile terminal in response to a location request message from a client terminal which contains requested accuracy of location information of the mobile terminal. The requested accuracy is copied into the control message. In response to the control message, the mobile terminal selects one of the positioning methods that satisfies the requested accuracy of the control message and operates the location processor of the selected method to produce measurement data.

Specifically, the mobile terminal has capability information indicating positioning methods supported by the mobile terminal and selectability of the positioning methods. The controlling node receives the capability information from the mobile terminal and transmits the control message as a first control message to the mobile terminal if the capability information indicates that the mobile terminal is capable of selecting positioning methods, and a second control message to the mobile terminal if the capability information indicates that the mobile terminal is not capable of selecting positioning methods. The second control message specifies one of the positioning methods supported by the mobile terminal, and wherein the mobile terminal is responsive to the second control message for operating one of the location processors whose method is specified in the second control message to producing measurement data.

According to a second aspect, the present invention provides a locating method by using a mobile communication network, wherein the network comprises a mobile terminal capable of performing measurement for locating the mobile terminal according to different positioning methods, a plurality of wireless nodes for establishing a wireless link to the mobile terminal, and a controlling node connected to the wireless nodes. The method comprises the steps of transmitting a control message from the controlling node to the mobile terminal in response to a location request message from a client terminal. The location request message contains requested accuracy of location information of the mobile terminal, and the control message contains a copy of the requested accuracy. At the mobile terminal, one of the positioning methods that satisfies the requested accuracy of the control message is selected and measurement is performed according to the selected method to produce measurement data.

According to a third aspect, the present invention provides a mobile terminal for a cellular communication network. The mobile terminal comprises control means for (a) transmitting capability information to the network, indicating positioning methods supported by the mobile terminal, (b) receiving a first control message from the network indicating that the mobile terminal is responsible for selecting positioning methods and containing accuracy of location information of the mobile terminal requested by a client terminal, (c) selecting one of the positioning methods if the requested accuracy is satisfied by at least one of the positioning methods, (d) receiving a second control message from the network specifying a positioning method, and (e) selecting the positioning method specified in the second control message; and a plurality of location processors of different positioning methods, one of the location processors whose method is selected by the control means producing measurement data.

BRIEF DESCRIPTION OF THE DRAWINGS

The present invention will be described in detail further with reference to the following drawings, in which:

FIGS. 3A, 3B, 3C and 3D are illustrations of the contents of control messages used in the present invention;

FIG. 16 is a flowchart of the operation of the UE terminal when the moving speed of the UE terminal is used for selecting a positioning method;

FIG. 17 is an illustration of a mapping table used by the UE terminal when operating according to FIG. 16;

FIG. 18 is a flowchart of the operation of the UE terminal when the distance traveled by the UE terminal is used for selecting a positioning method;

FIG. 19 is an illustration of a mapping table used by the UE terminal when operating according to FIG. 18;

DETAILED DESCRIPTION

Figure 1:
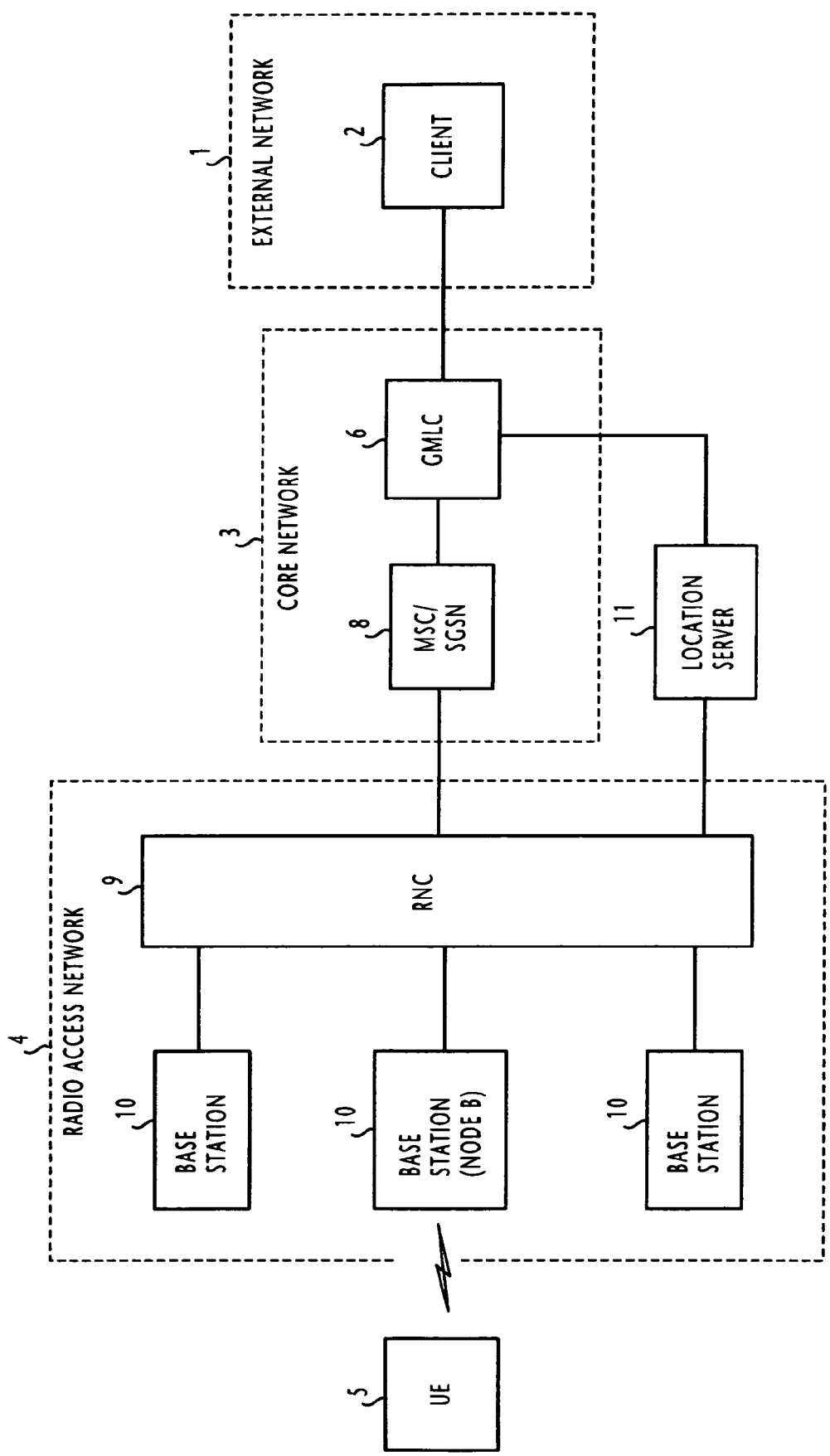
FIG. 1 is a block diagram of a location system of the present invention.

Referring now to FIG. 1, there is shown a location system constructed with basic network elements or nodes arranged in a simplified network configuration as a typical example for the description of the present invention. The system is generally comprised of an external communications network 1 such as PSTN (public switched telephone network), a core network 3 and a radio access network (RAN) 4. An LCS (LoCation System) client terminal 2 of the external network 1 accesses the core network 3 when the client requests location service from the system. Core network 3 includes GMLC (Gateway Mobile Location Center) 6, a MSC (Mobile Switching Center)/SGSN 8 (Serving General packet radio service Support Node) connected to the GMLC 6. MSC/SGSN 8 is normally responsible for making registration of both home and visiting mobile terminals in an associated home location database, not shown, and updates their associated serving node (MSC/SGSN) when they change their location. Radio access network 4 comprises a radio network controller (RNC) 9 and a plurality of wireless base stations 10 located at respective cell-site and connected through land lines to the RNC 9. These base stations 10 are known as "nodes B" according to the 3GPP terminology. RNC 9 performs location service control functions between the MSC/SGSN and each base station 10. A mobile terminal 5, known as user equipment (UE), is shown wirelessly connected to one of the base stations 10.

A location server 11 may be connected to the GMLC 6, as an independent network entity of the core network, to exchange control messages directly with the UE terminal 5 for position measurement and calculation by operating an application program, using the RNC and the associated base station as a message repeater.

Figure 2:
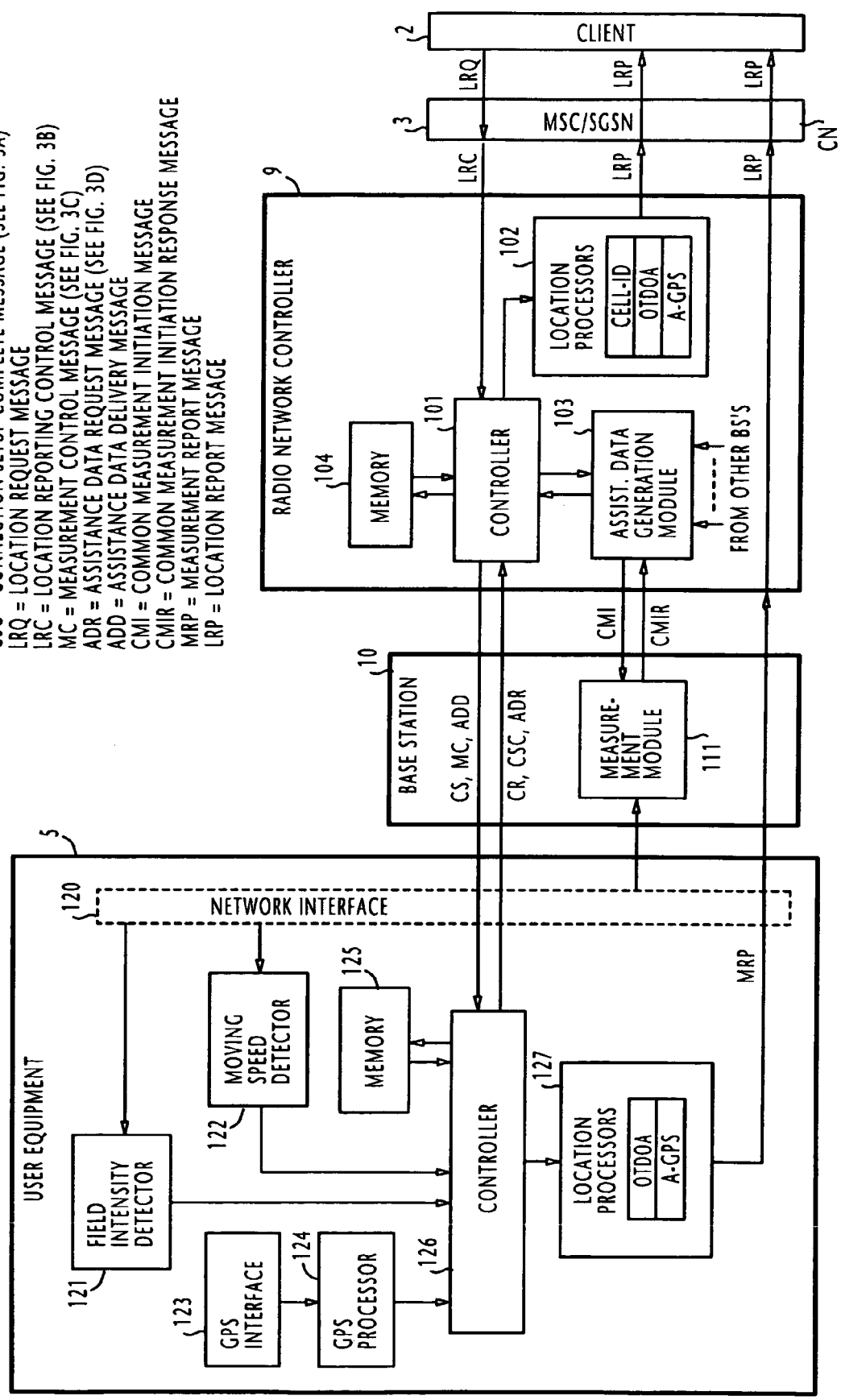
FIG. 2 is a block diagram illustrating details of the network nodes of the location system according to one embodiment of the present invention.

Details of the network nodes of FIG. 1 are illustrated in FIG. 2, in which logical paths are used, instead of physical paths, for interconnecting various functions and for message transmission.

Radio network controller 9 is comprised of a controller 101, a location processors module 102, a memory 104, and an assistance data generation module 103. Base station 10 includes a field intensity detector 111 for detecting field intensities of wireless signals from mobile terminals and reports the detected field intensities to the assistance data generation module 103 when requested by the RNC controller 101. Location processors module 102 performs location measurement and calculation according to one of a plurality of positioning methods specified by the controller 101.

These positioning methods include the Cell-ID mode, the A-GPS (network assisted GPS) mode, the UE-based OTDOA (observed time difference of arrival) mode, and the UE-assisted OTDOA mode.

The Cell-ID mode is a method that determines the identity of a cell in which the target UE is in and the identity of the cell is used as a location of the UE terminal. The precision of this method is said to lie in the range 100 meters to several kilometers. In the UE-assisted mode of OTDOA, the UE measures the difference in time of arrival of base-transmitted signals and transmits the measurement results to the network, where the RNC carries out the position calculation. In the UE-based mode, the UE makes the measurements and also carries out the position calculation and thus requires additional information (such as the position of the measured base stations) that is required for the position calculation. The precision of this method is between 50 meters and 150 meters. In the A-GPS, the UE terminal calculates the phase differences between GPS signals to determine the distances between the UE and the GPS satellites. The precision of this method is said to be 5 to 10 meters.

UE terminal 5 includes a network interface 120 for receiving signals from surrounding base stations and establishing a connection to the nearest base station. A field intensity detector 121, connected to the interface 120, detects the field intensities of the base-transmitted signals and provides its output to a controller 126. A moving speed detector 122, also connected to the network interface 120, measures the moving speed of the UE terminal 5. A GPS (Global Positioning System) interface 123 is provided to receive signals from GPS satellites. A GPS processor 124 is connected to the GPS interface to perform measurement and calculation on the received GPS signals and feeds its output to the controller 126. Controller 126 uses the output of the field intensity detector 121 to determine the count number of surrounding base stations which can be used for position calculation and stores this count number in a memory 125. Controller 126 uses the output of the moving speed detector 122 to determine the distance travelled by the UE during a specified time interval. Further, the controller 126 uses the output of the GPS processor 124 to determine the count number of GPS satellites used in the position calculation and stores this count number into the memory 125.

UE terminal 5 is further provided with a location processors module 127. This module performs measurement and/or position calculation according to one of the positioning methods which is selected by the UE terminal 5 or specified by the RNC 9. The information of the positioning capability of the UE terminal 5 is stored in the memory 125.

In addition, response time data are stored for different positioning methods to be used as a reference for comparison with a requested waiting time.

The UE's controller 126 exchanges various control messages with the RNC controller 101 via the base station 10.

When the UE terminal 5 establishes a connection to the mobile communication network, the controller 126 transmits a RRC (radio resource control) connection request (CR) message to the RNC 9 via the base station 10. In response, the RNC controller 101 returns a connection setup (CS) message to the UE controller 126. The UE controller 126 establishes a connection to the RNC 9 and reads the UE's positioning capability information from the memory 125 and formulates a connection setup complete (CSC) message with the capability information and transmits it to the RNC 9.

As illustrated in FIG. 3A, the connection setup complete message includes a positioning method selectability field 31, a UE-based OTDOA field 32 and a network assisted GPS field 33. If the UE terminal 5 is capable of selecting positioning methods, a "1" is set in the field 31. Otherwise, a "0" is set in the field 31. If the UE terminal 5 supports the UE-based OTDOA (as well as UE-assisted OTDOA), a "1" is set in the field 32. Otherwise, a "0" is set in the field 32. In the GPS field 33, if the network-based GPS is supported, a "0" is set, and if the UE-based GPS is supported, a "1" is set, and if both network-based and UE-based GPS methods are supported, a "2" is set. If the network-assisted GPS method is not supported, a "3" is set in the field 33.

Upon receipt of the connection setup complete message from the UE terminal, the RNC 9 stores the positioning capability information contained in the message into the memory 104.

When the client terminal 2 desires the location information of the UE terminal, it transmits a location request (LRQ) message to the core network 3, which is passed on through the GMLC 6 to the MSC/SGSN 8 of the core network 3. In response to the client's location request message requesting the location of the target UE, the MSC/SGSN 8 transmits a location reporting control (LRC) message to the RNC 9.

As shown in FIG. 3B, the location reporting control message includes a horizontal accuracy code field 34, a vertical accuracy code field 35 and a response time field 36. The codes indicating the horizontal and vertical accuracy of the location information as requested by the client are set in the fields 34 and 35, respectively, and the response time (waiting time) requested by the client to receive a location report is set in the response time field 36.

Figure 4:
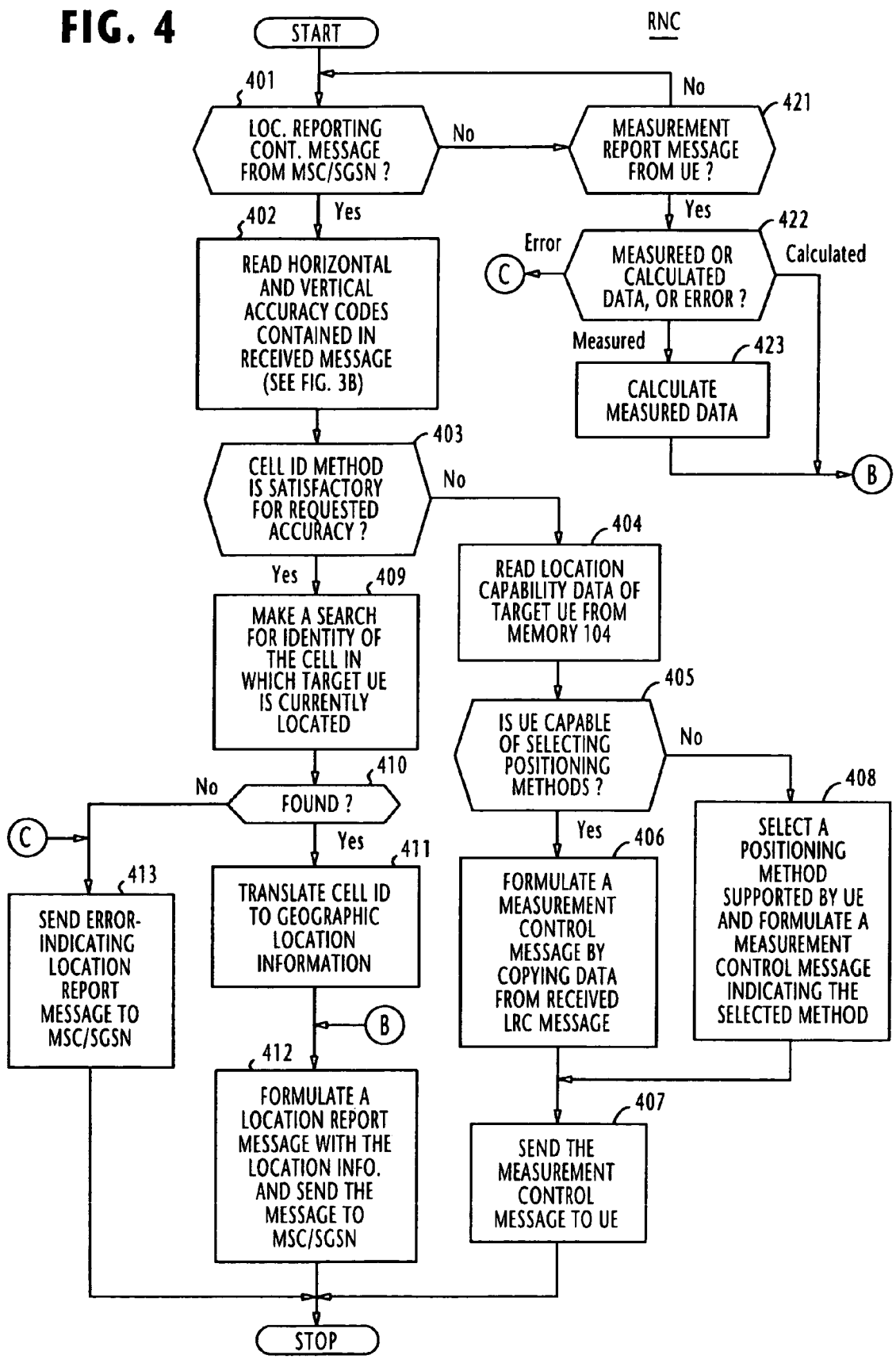
FIG. 4 is a flowchart of the operation of the radio network controller (RNC) of FIG. 2 according to one embodiment of the present invention.
Figure 6:
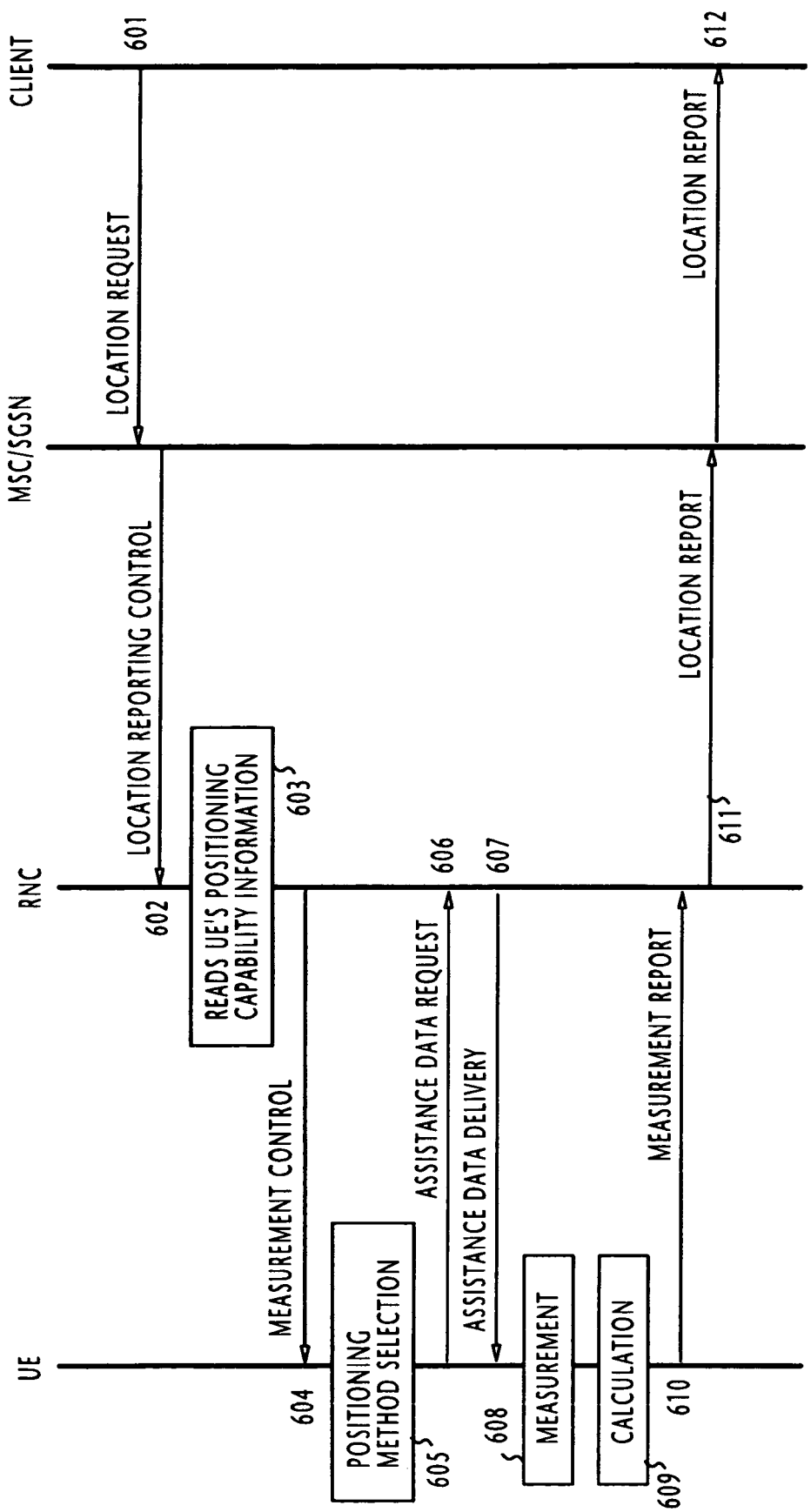
FIG. 6 is a sequence diagram of events that occur when the RNC and UE terminal operate according to the flowcharts of FIGS. 4 and 5.

FIG. 4 is a flowchart of the operation of the RNC' controller 101 according to one embodiment of the present invention, which will be described in conjunction with a sequence diagram shown in FIG. 6. In response to a location request (LRQ) message from the client (event 601, FIG. 6), the MSC/SGSN 8 formulates a location reporting control (LRC) message (event 602) and transmits the message to the RNC 9, the controller 101 receives the LRC message (step 401) and proceeds to step 402 to read the horizontal and vertical accuracy codes contained in the received message (event 603, FIG. 6). At step 403, the controller 101 checks to see if the Cell-ID positioning method is satisfactory for the requested accuracy.

If the Cell-ID positioning method is not satisfactory for the requested accuracy, the controller 101 proceeds from step 403 to step 404 to read the location capability information of the UE terminal 5 from the memory 104 and determines whether the UE terminal is capable of selecting positioning methods.

If the UE terminal is capable of selecting a positioning method, flow proceeds from step 405 to step 406 to formulate a measurement control (MC) message. As shown in FIG. 3C, the MC message includes a positioning methods field 37, a horizontal accuracy code field 38, a vertical accuracy code field 39 and a response time field 40. In the MC message, the accuracy codes and response time data are copied from the received LRC message into the fields 38, 39 and 40 of the MC message. The MC message is then transmitted from the RNC 9 to the UE terminal 5 (step 407, event 604). If the decision at step 405 is negative, flow proceeds to step 408 to select one of the positioning methods which is supported by the UE terminal and the controller 101 formulates a MC message by setting the selected method indication in its positioning methods field 37 and transmits the message (step 407).

If the Cell-ID method is satisfactory for the requested accuracy, flow proceeds from step 403 to step 409 for making a search for the cell in which the UE terminal 5 is currently located and recognizes its cell identity. If the UE's current cell is found (step 410), flow proceeds to step 411 to translate the cell identity to corresponding geographic location information. At step 412, a location report (LRP) message is formulated with the location information and transmitted back to the MSC/SGSN 8. If no cell is found (step 410), flow proceeds to step 413 to send an error-indicating location report message to the MSC/SGSN 8.

Figure 5:
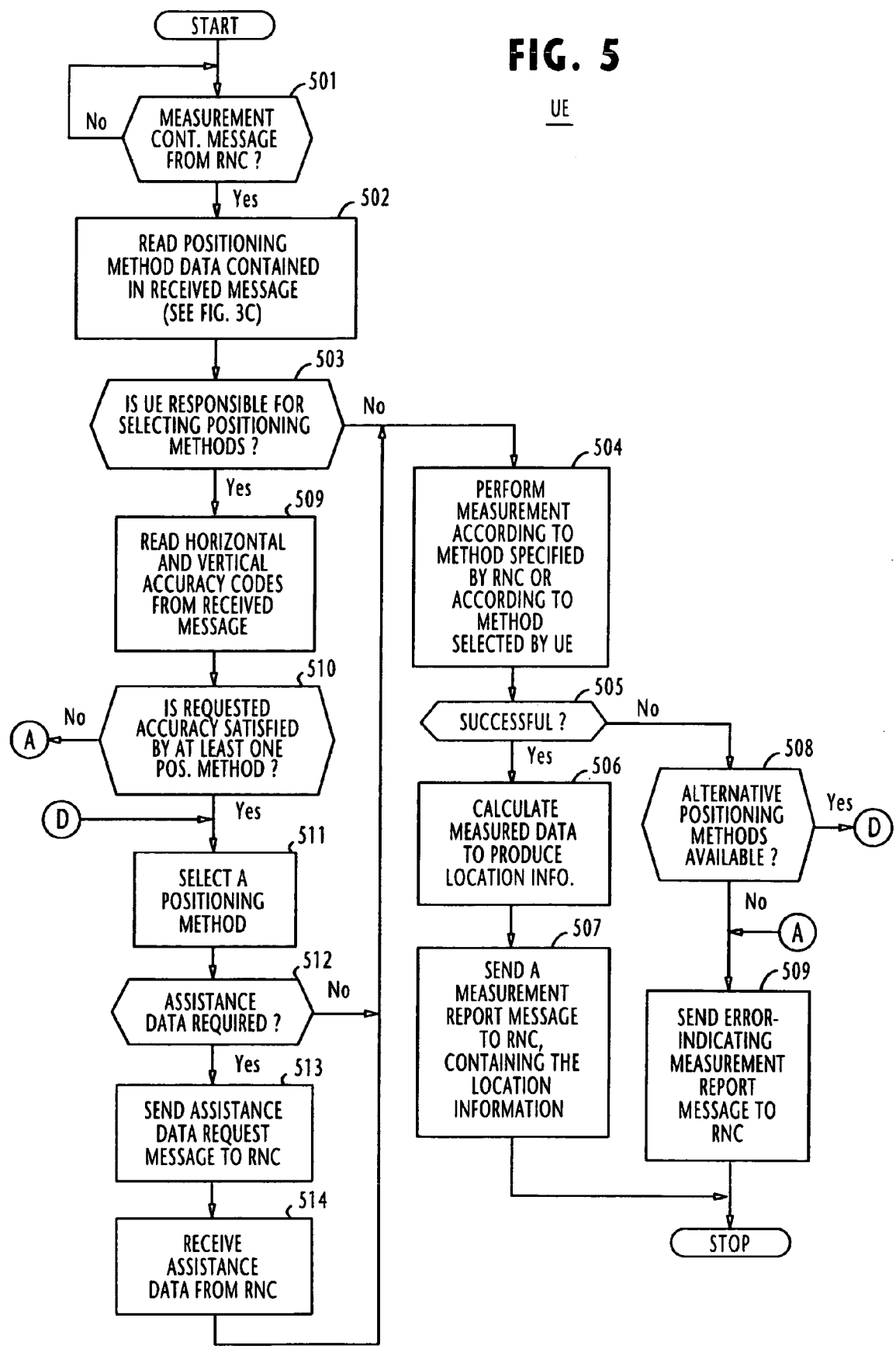
FIG. 5 is a flowchart of the operation of the user equipment (UE) terminal of FIG. 2 associated with FIG. 4.

Referring to FIG. 5, the operation of the UE's controller 126 begins with the reception of a measurement control (MC) message from the RNC 9 (step 501). Controller 126 proceeds to step 502 to read the positioning method data contained in the received MC message (FIG. 3C) and examines its positioning method field 37 and determines whether the UE terminal is responsible for selecting a positioning method (step 503). If the UE terminal is not responsible for selecting a positioning method, flow proceeds from step 503 to step 504 to perform measurement according to the positioning method specified in the positioning method field 37 of the received MC message. If the measurement is successful (step 505), the measured data is used to calculate the position of the UE terminal to produce its location information (step 506). At step 507, a measurement report (MRP) message is formulated with the location information and transmitted back to the RNC 9. If the measurement is not successful (step 505), flow proceeds to step 508 to check to see if alternative positioning methods are available. If so, the controller 126 proceeds to step 511 to select one of the alternative positioning methods.

If no alternative methods are available, flow proceeds from step 508 to 509 to send an error-indicating measurement report message to the RNC 9. Alternatively, step 509 may be executed when it is determined at step 505 that the measurement is not successful by skipping step 508.

If the UE terminal is responsible for selecting positioning methods (step 503), the controller 126 proceeds to step 509 to read the horizontal and vertical accuracy codes contained in the received MC message, and checks to see if the requested accuracy is satisfied by at least one of the positioning methods (step 510). If so, flow proceeds to step 511 to select one of the positioning methods (event 605).

Controller 126 determines, at step 512, whether assistance data is required. If not, flow returns to step 504 to perform measurement according to the positioning method selected by the UE terminal at step 511. If assistance data is required, the controller 126 sends an assistance data request (ADR) message to the RNC 9 (step 513, event 606). As shown in FIG. 3D, the ADR message includes a positioning methods field 41 and a method type field 42. In the positioning field 41, the positioning method selected by the UE terminal is indicated. Method type field 42 indicates which one of the UE-based and UE-assisted modes of the selected positioning method is selected.

As will be described in detail later, the RNC 9 responds to the ADR message by producing assistance data and returning an assistance data delivery (ADD) message to the UE terminal (event 607).

When the UE controller 126 receives the ADD message from the RNC 9 (step 514), it returns to measurement step 504 to perform measurement using the additional assistance data (event 608). If the measurement is successful (step 505), position calculation is performed on the measured data (step 506, event 609). A measurement report (MRP) message is then formulated with the calculated position data and transmitted to the MSC/SGSN 8 (step 507, event 610).

Returning to FIG. 4, the RNC controller 101 receives the MRP message from the UE terminal at step 421. Controller 101 checks to see the MRP message contains a measured or calculated result, or an error indication. If the MRP message contains a measured result, flow proceeds to step 423 to calculate the position of the UE terminal using the measured result and proceeds to step 412 to send a location report (LRP) message to the MSC/SGSN 8 (event 611). If the MRP message contains a calculated result, flow proceeds to step 412. If the MRP message is an error-indicating message, the controller proceeds to step 413 to send an error report to the MSC/SGSN. Location report message from the RNC 9 is repeated by the MSC/SGSN to the client terminal (event 612).

Figure 7:
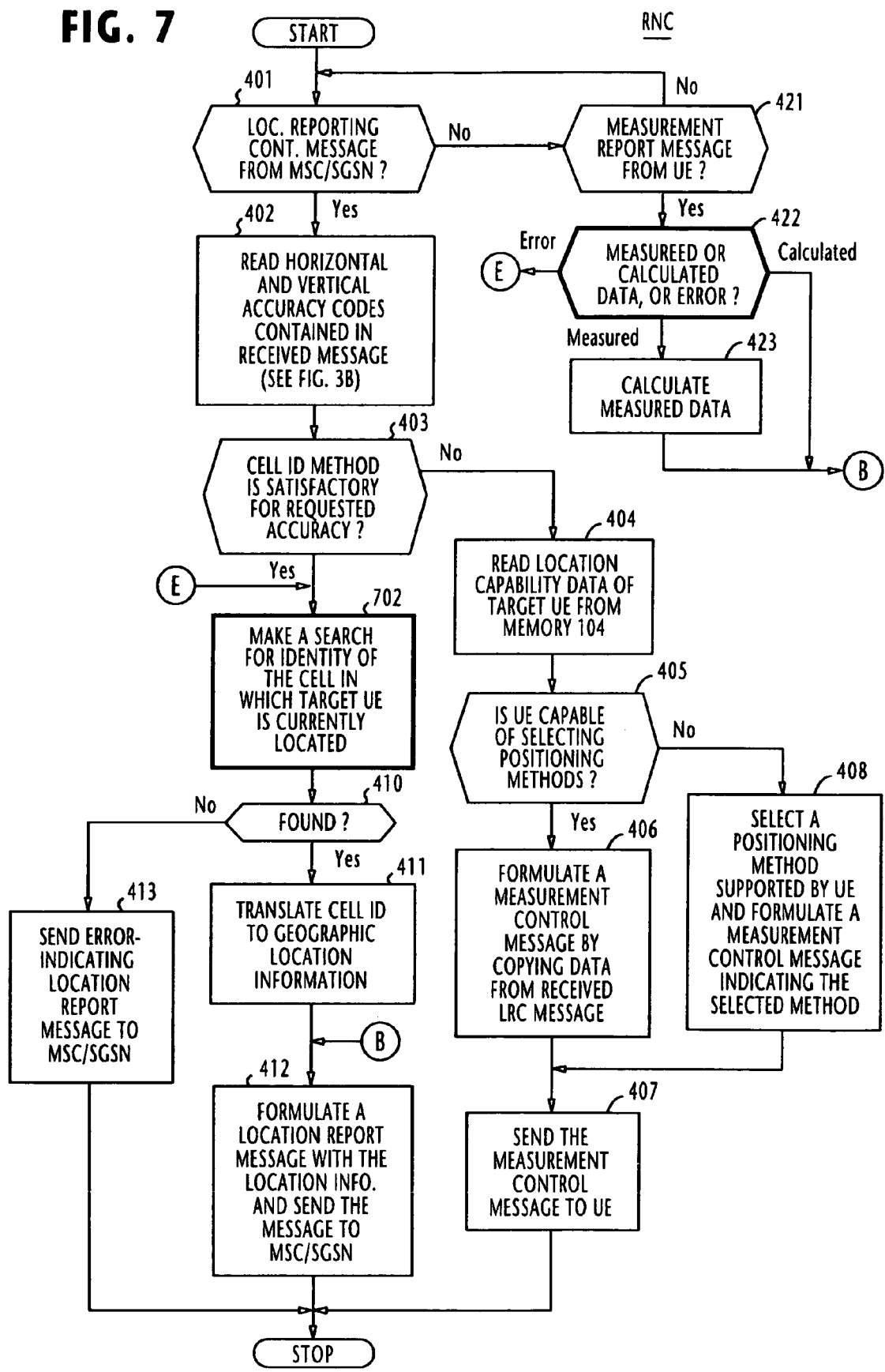
FIG. 7 is a flowchart of the operation of the RNC according to a modification of FIG. 4 when the UE terminal fails in measurement/position calculation.

A modified embodiment of the RNC 9 is illustrated in FIG. 7. When the UE terminal fails in measuring signals according to OTDOA or A-GPS method and an error-indicating LRP message is returned to the RNC 9, the RNC controller 101 recognizes this fact at decision step 701 and proceeds to cell-search step 702 to perform a Cell-ID positioning method. Although the client is informed of less accurate location information than it requested, it is better than the error-reporting message.

Figure 8:
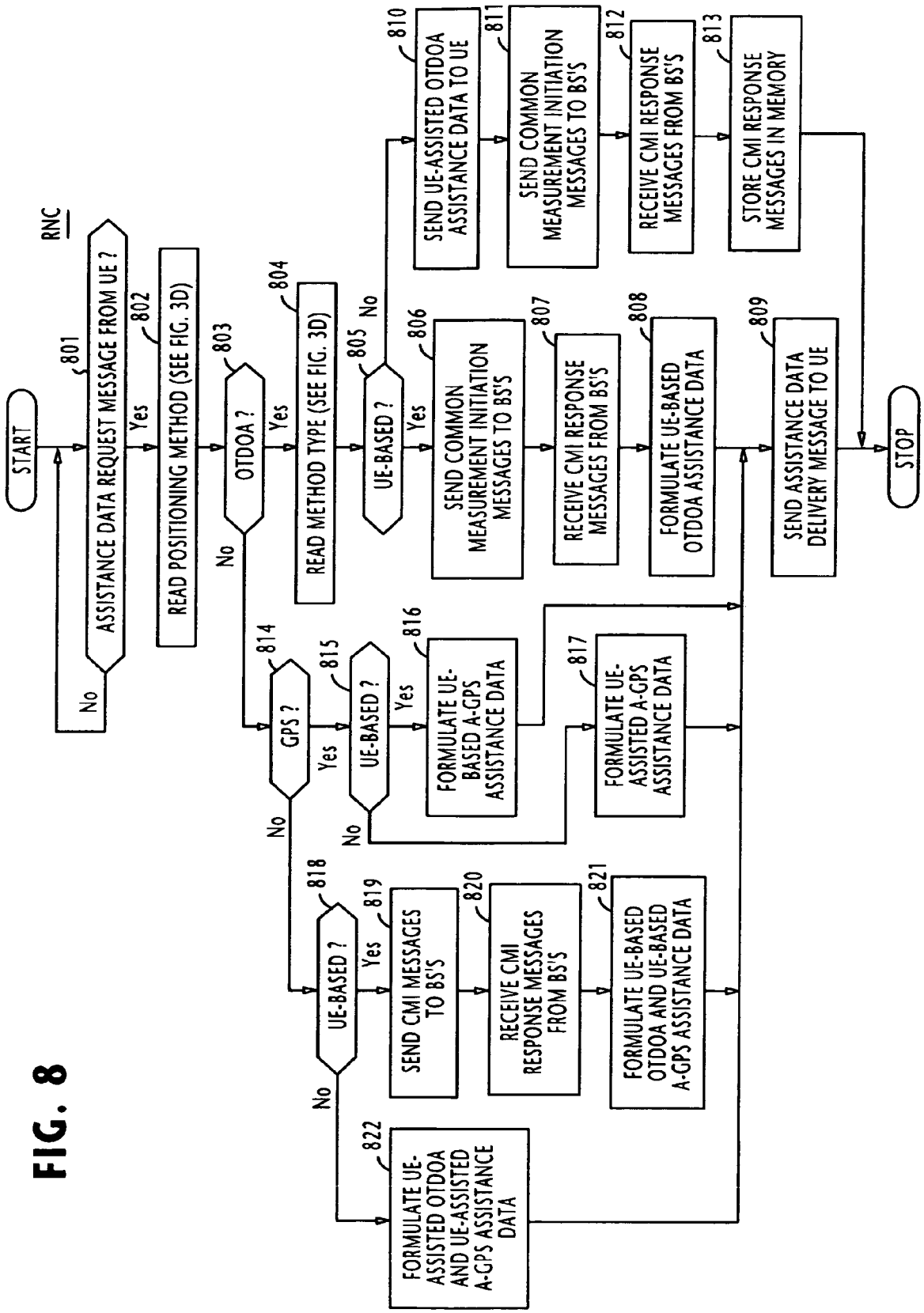
FIG. 8 is a flowchart of the operation of the RNC when it responds to an assistance data request message from the UE terminal.

FIG. 8 shows details of the operation of RNC 9 when delivering assistance data to the UE terminal in response to its AD request message (step 801). At step 802, the positioning method specified in the received ADR message is read. RNC controller 101 determines whether OTDOA method is specified. If so, flow proceeds to step 804 to read data from the method type field of the message. If the UE-based OTDOA is specified (step 805), the RNC controller 101 transmits a request message known as "common measurement initiation (CMI)" message to a plurality of base stations 10. In each base station, the measurement module 111 measures the time of transmission of its cell-site signal to the UE terminal and notifies the RNC 9 of the transmission time. Each base station encapsulates the measurement result in a CMI message and transmits the message to the RNC 9. RNC controller 101 receives such CMI response messages from the base stations 10 (step 807) and formulates UE-based OTDOA assistance data with the measured cell-site transmission times (step 808) and encapsulates the UE-based OTDOA assistance data in an assistance data delivery (ADD) message and transmits the message to the UE terminal 5 (step 809).

If the decision at step 805 is negative, the RNC controller determines that UE-assisted mode is selected, and proceeds to step 810 to transmit a UE-assisted OTDOA assistance data message to the UE terminal, containing a number of codes specifying base stations so that the UE terminal measures the time difference of arrivals from the specified base stations. At step 811, the RNC controller 101 transmits a CMI message to base stations 10 and receives CMI response messages from the base stations (step 812). The transmission time data of the base stations contained in the received CMI messages are stored in the memory 104 (step 813) to perform the position calculation on the measurement results which will be supplied from the UE terminal 5.

If the decision at step 803 is negative, the RNC controller determines that GPS mode is selected, and proceeds to step 814 to check to see if the UE-based A-GPS method is specified in the received message (step 815). If this is the case, the RNC controller proceeds to step 816 to formulate UE-based A-GPS assistance data and encapsulates it in an assistance data delivery message and transmits the message to the UE terminal. If the decision at step 815 is negative, it is determined that UE-assisted A-GPS method is specified and flow proceeds to step 817 to formulate UE-assisted A-GPS assistance data, which is then encapsulated in an assistance data delivery message and transmitted to the UE terminal (step 809).

If the decision at step 814 is negative, flow proceeds to decision step 818 to determine whether the GPS method is of the UE-based or UE-assisted mode. If the GPS method is UE-based, the RNC controller proceeds to step 819 to transmit CMI messages to a number of base stations to receive their CMI response messages (step 820) and formulates UE-based OTDOA and UE-based A-GPS assistance data with the CMI response messages at step 821, which is then encapsulated in an assistance data delivery message and transmitted to the UE terminal (step 809). If the GPS method is UE-assisted, the RNC controller proceeds from step 818 to step 822 to formulate UE-assisted OTDOA and UE-assisted A-GPS assistance data, which is then encapsulated in an assistance data delivery message and transmitted to the UE terminal (step 809).

Figure 9:
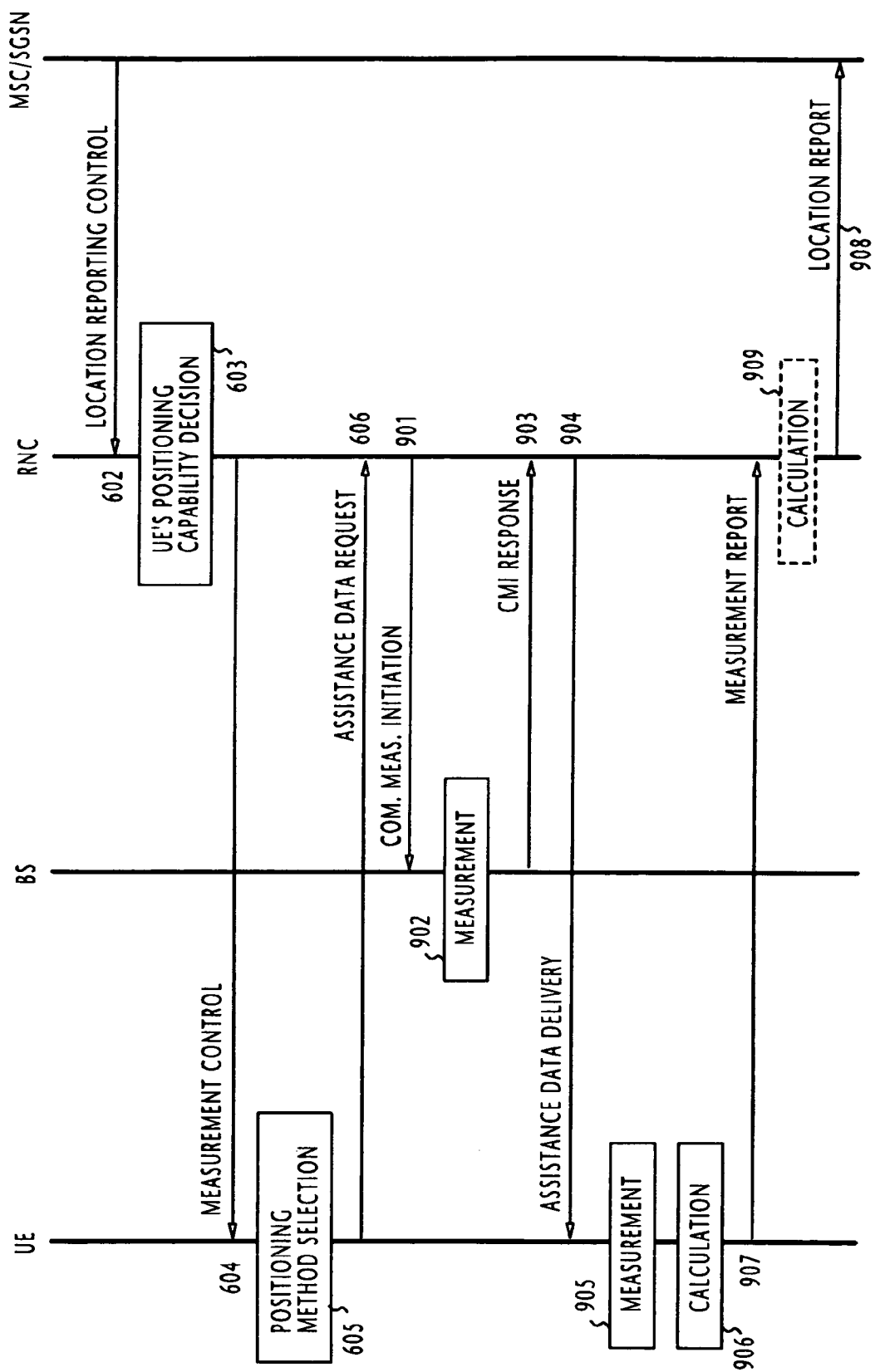
FIG. 9 is a sequence diagram of events that occur when the RNC and the UE terminal operate according to the flowchart of FIG. 8.

The overall operation of the system according to the flowchart of FIG. 8 is illustrated in the sequence diagram of FIG. 9. When the RNC receives an assistance data request message (event 606), it sends CMI messages (event 901) to base stations (only one base station is illustrated for simplicity). Each base station performs the measurement of the time of its transmission to the UE terminal and returns a CMI response message to the RNC (event 902). In response, the RNC trransmits an assistance data delivery message to the UE terminal (event 904). The UE terminal responds to the ADD message by performing measurement (event 905). If the selected positioning method is other than UE-assisted OTDOA, the UE terminal provides the position calculation (event 906) and returns a measurement report message to the RNC (event 907), which then returns a location report message to the MSC/SGSN (event 908). If the selected positioning method is UE-assisted OTDOA, the UE terminal does not perform the position calculation 906. Instead, the RNC performs the position calculation (event 909) in response to receipt of the measurement report message.

Figure 10:
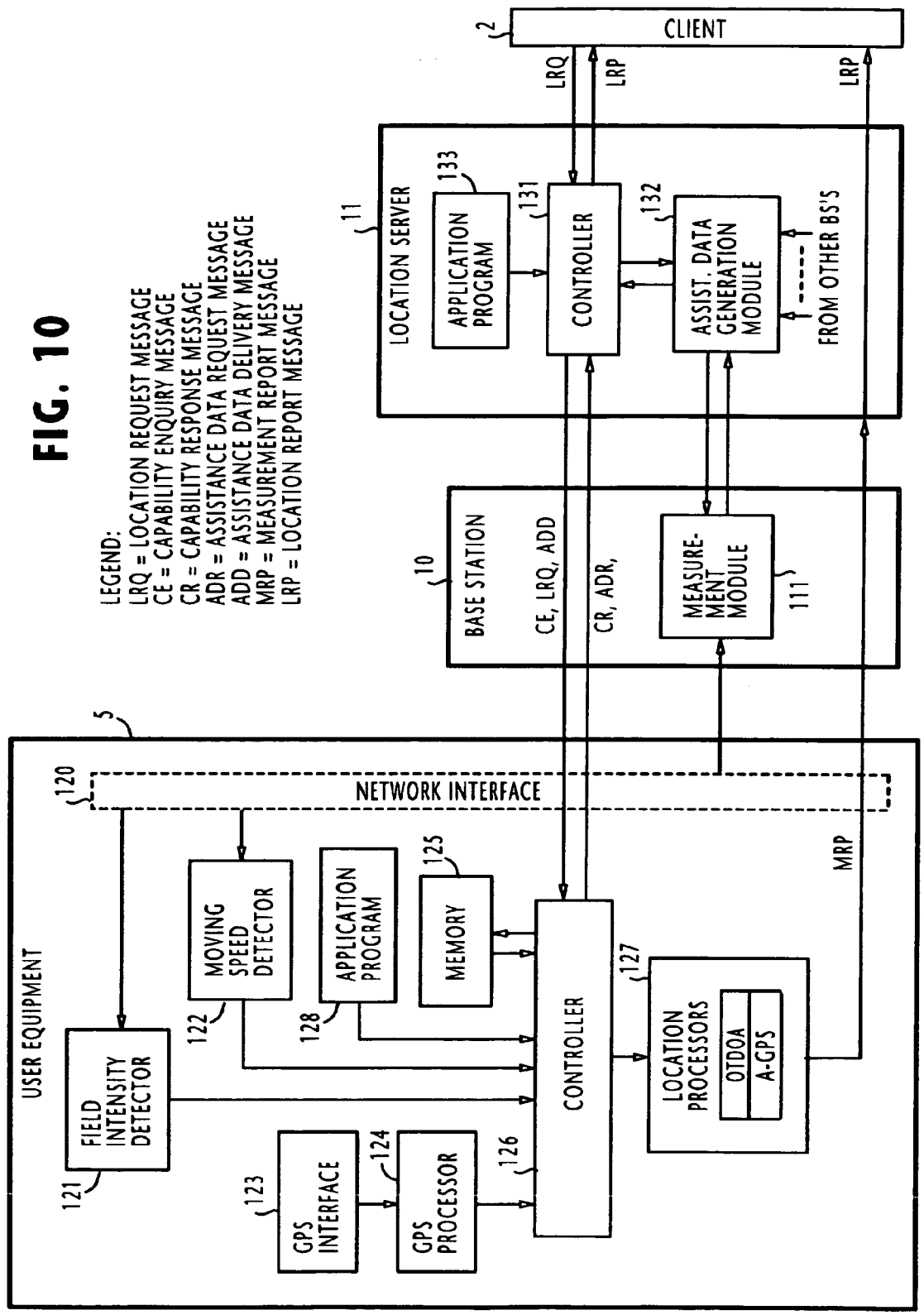
FIG. 10 is a block diagram illustrating details of the network nodes of the location system when the location server is used to exchange control data direct with the UE terminal according to a location application program.

In a modified embodiment shown in FIG. 10, a logical two-way communication path is established between the location server 11 and the UE terminal 5 to exchange control messages, using the RNC and the UE-communing base station as physical repeating mediums. Location server 11 includes a controller 131, an assistance data generation module 132 and a memory 133 for storing a location application program. UE terminal 5 additionally includes a memory 128 for storing a location application program. Controller 126 operates according to the location application program and interacts with the server controller 131 running on its location application program.

Figure 11:
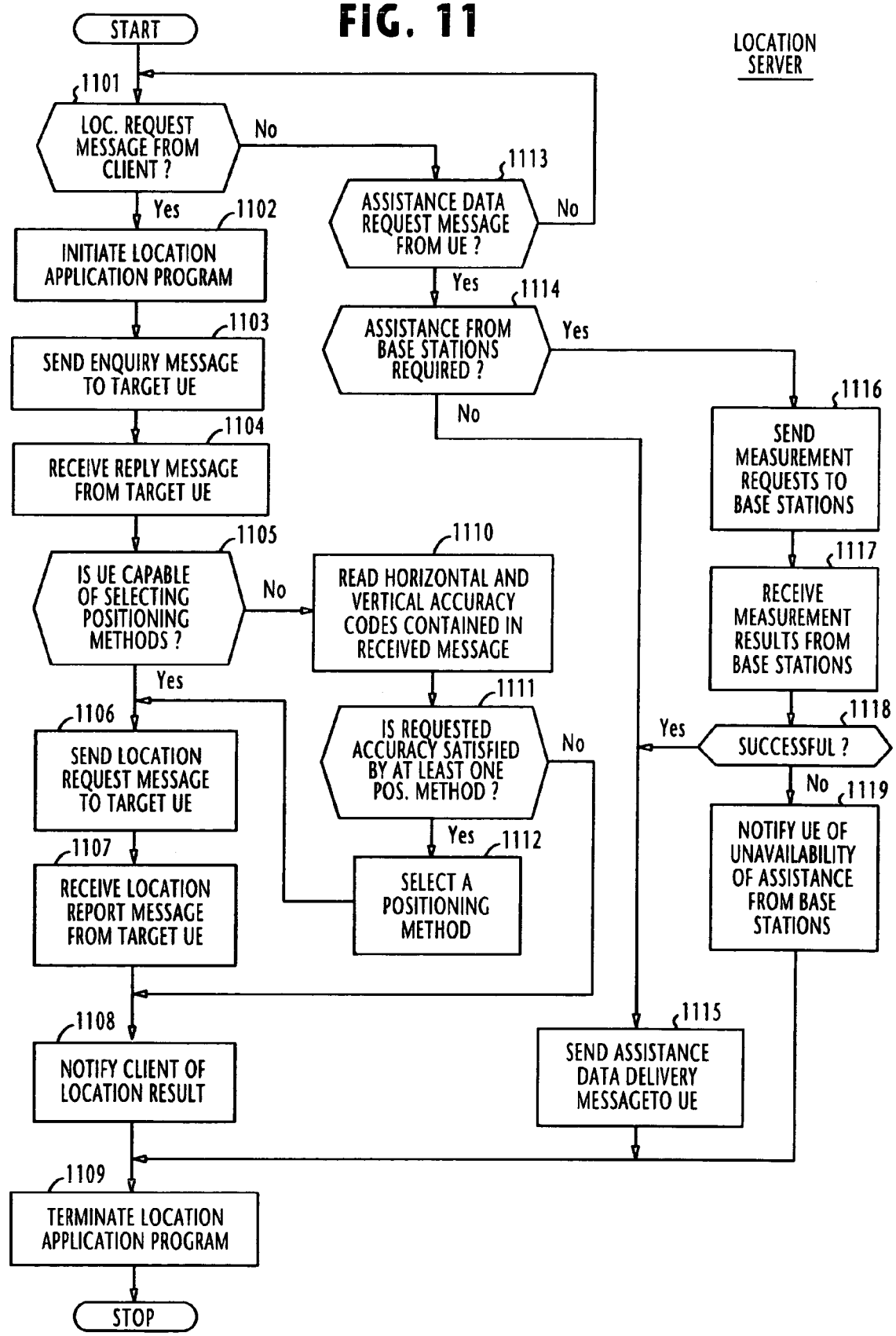
FIG. 11 is a flowchart of the operation of the location server of FIG. 10.

The operation of the location server 11 proceeds according to the flowchart of FIG. 11. When the location server 11 receives a location request message from the client terminal (step 1101), the server controller 131 initiates its location application program (step 1102) to establish a connection to the UE controller 126 and transmits an enquiry message to the UE controller 126 (step 1103) to receive a reply message from the target UE (step 1104). The reply message contains the positioning capabilities of the UE terminal 5. Server controller 131 examines the reply message and determines whether the UE terminal is capable of selecting positioning methods. If the UE terminal is capable of selecting positioning methods, flow proceeds to step 1106 to transmit a location request message to the target UE terminal to receive a location report message from the UE terminal (step 1107). Server controller 131 notifies the client terminal of the location result (step 1108) and terminates the location application program (step 1109).

If the decision at step 1105 is negative, flow proceeds to step 1110 to read the horizontal and vertical accuracy codes contained in the location request message received from the client terminal. At step 1111, the server controller 131 checks to see if the requested accuracy is satisfied by at least one positioning method. If so, one of the positioning methods is selected at step 1112 and flow proceeds to step 1106 to transmit a location request message to the UE terminal, requesting it to perform measurement and/or position calculation according to the selected positioning method. If the requested accuracy is not satisfied by any of the positioning methods, flow branches out from step 1111 to step 1108 to notify the client of this fact.

If an assistance data request message is received from the UE terminal (step 1113), the server controller 131 proceeds to step 1114 to determine if assistance from base stations is required. If no assistance from base stations is required, flow proceeds to step 1115 to formulate an assistance data delivery message with its own assistance data and transmits the message to the UE terminal and terminates the location application program (1109). If assistance from base stations is required, flow proceeds from step 1114 to step 1116 to transmit a measurement request message to a number of base stations and receive their measurement results (indicating the time of their signal transmission to the UE terminal) at step 1117. If the measurements are successful (step 1118), the server controller proceeds to step 1115 to formulate an assistance data delivery message with the measurement results and transmits the message to the UE terminal. If the measurements are not successful, flow proceeds from step 1118 to step 1119 to notify the UE terminal of the unavailability of assistance from base stations and terminates the location application program (step 1109).

Figure 12:
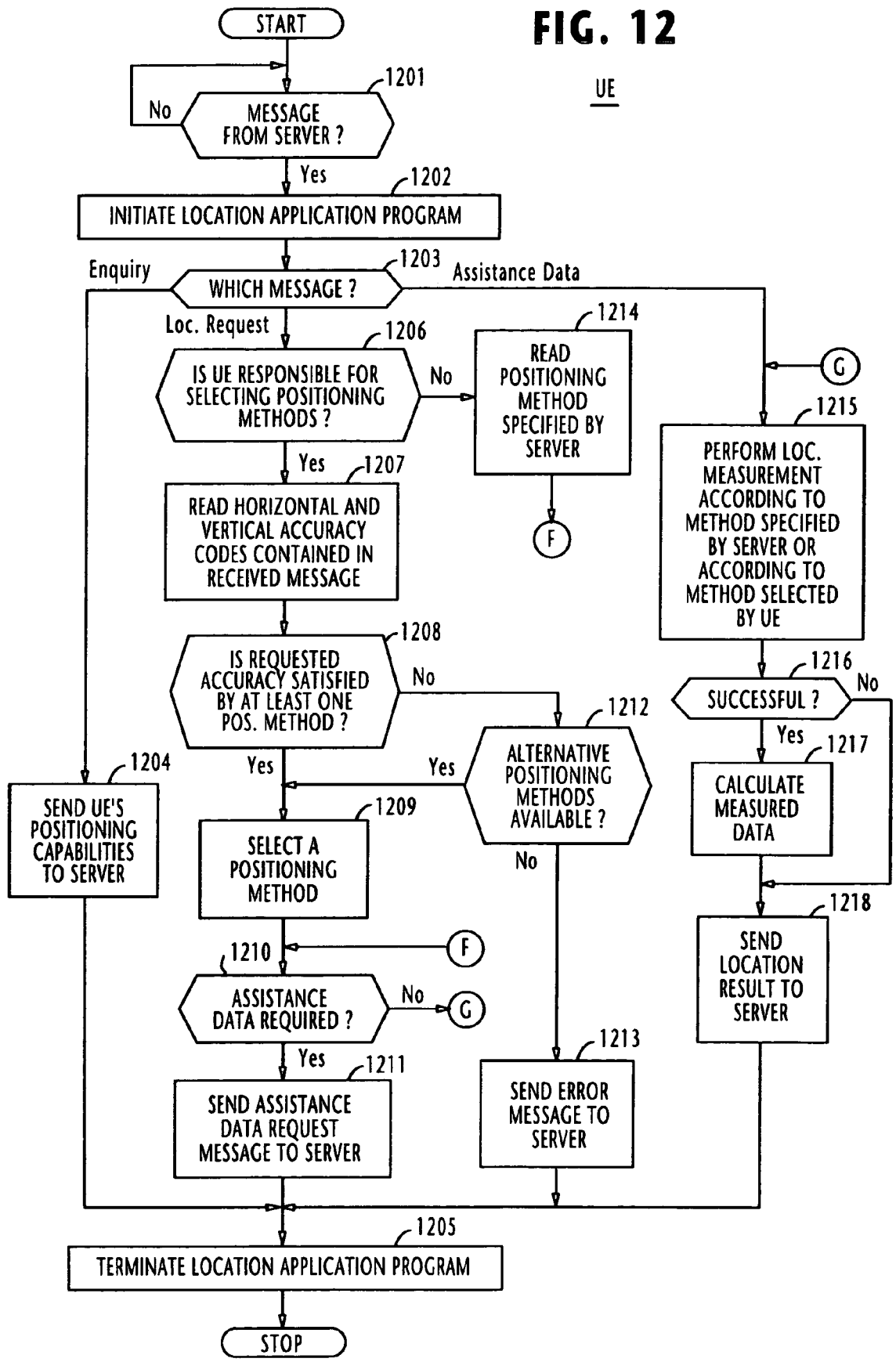
FIG. 12 is a flowchart of the operation of the UE terminal of FIG. 10.

The operation of the UE terminal in response to a message from the location server 11 proceeds according to the flowchart of FIG. 12. Upon receipt of a message from the server 11 (step 1201), the UE controller 126 proceeds to step 1202 to initiate the location application program, and determines the type of the received message. If the received message is an enquiry message, flow proceeds to step 1204 to transmit its positioning capabilities to the server 11 and terminates the location application program (step 1205).

If the received message is a location request, flow proceeds from step 1203 to step 1206 to determine if the UE terminal is responsible for selecting positioning methods. If so, flow proceeds to step 1207 to read the horizontal and vertical accuracy codes contained in the received location request message and then checks to see if the requested accuracy is satisfied by at least one positioning method. If the requested accuracy is satisfied by at least one positioning method, one of the positioning method is selected (step 1209). UE controller 126 then determines if assistance data is required for the selected positioning method (step 1210). If so, the UE controller transmits an assistance data request message to the location server 11 (step 1211) and proceeds to program termination step 1205.

If the decision at step 1208 is negative, flow proceeds to step 1212 to determine if alternative positioning methods are available. If so, flow proceeds to method selection step 1213. Otherwise, flow proceeds to step 1210 to send an error message to the location server 11. Note that decision step 1212 may be dispensed with depending on applications.

If the decision at step 1206 is negative, flow proceeds to step 1214 to read the positioning method specified in the received location request message and proceeds to decision step 1210.

If the decision at step 1210 indicates that no assistance data is required, flow proceeds to step 1215 to perform location measurement according to the positioning method selected by the UE terminal at step 1209. If the measurement is successful (step 1216), the UE controller proceeds to step 1217 to perform the position calculation and transmits the location result to the location server 11 (step 1218) and terminates the application program (step 1205). If the measurement is unsuccessful, step 1217 is skipped and an error-indicating location result message is sent to the location server (1218).

If the decision at step 1203 indicates that the message received from the location server is assistance data, flow proceeds to step 1215 to perform the location measurement.

Figure 13:
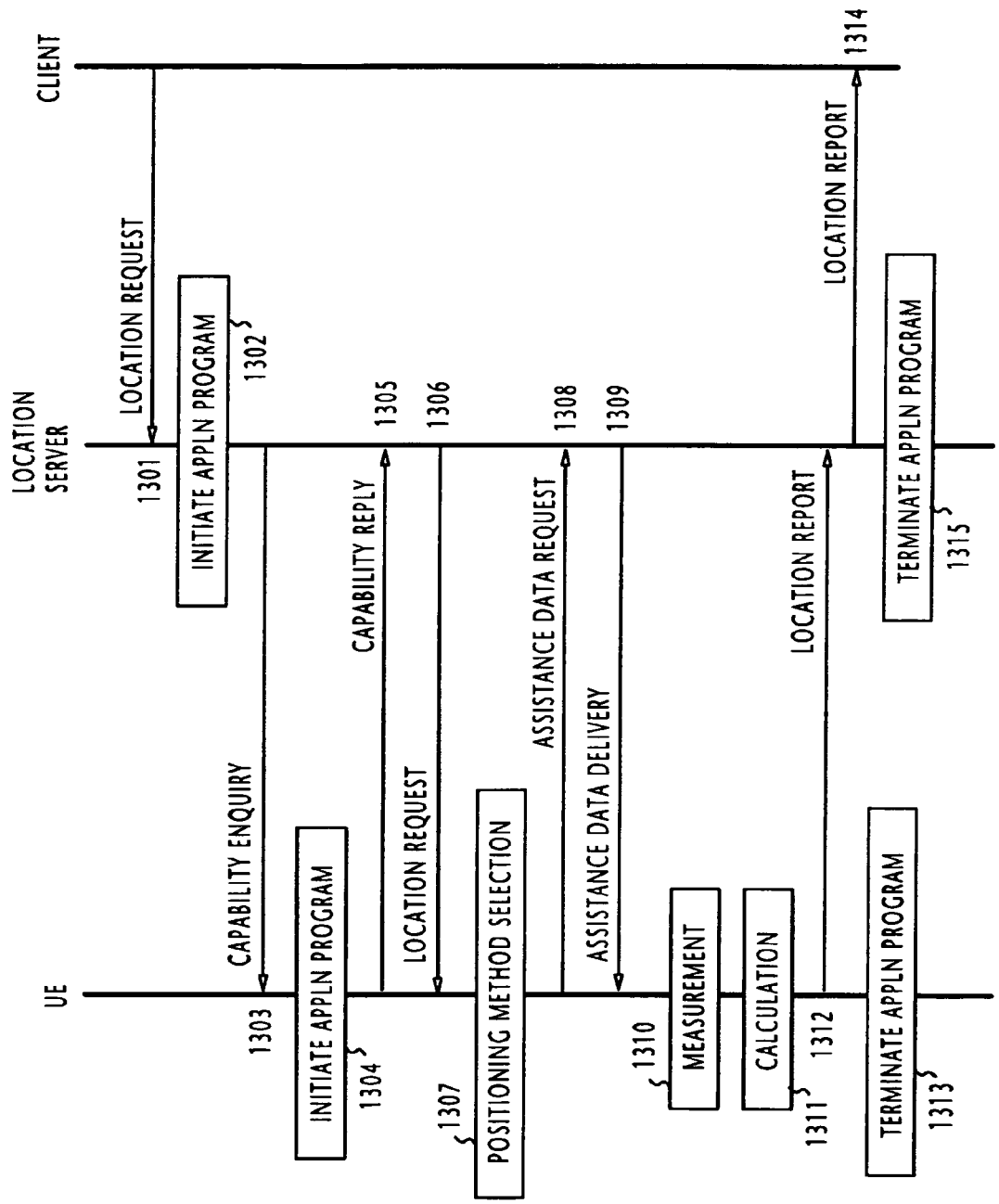
FIG. 13 is a sequence diagram of events that occur when the location server and the UE terminal operate according to the flowcharts of FIGS. 11 and 12.
Figure 14:
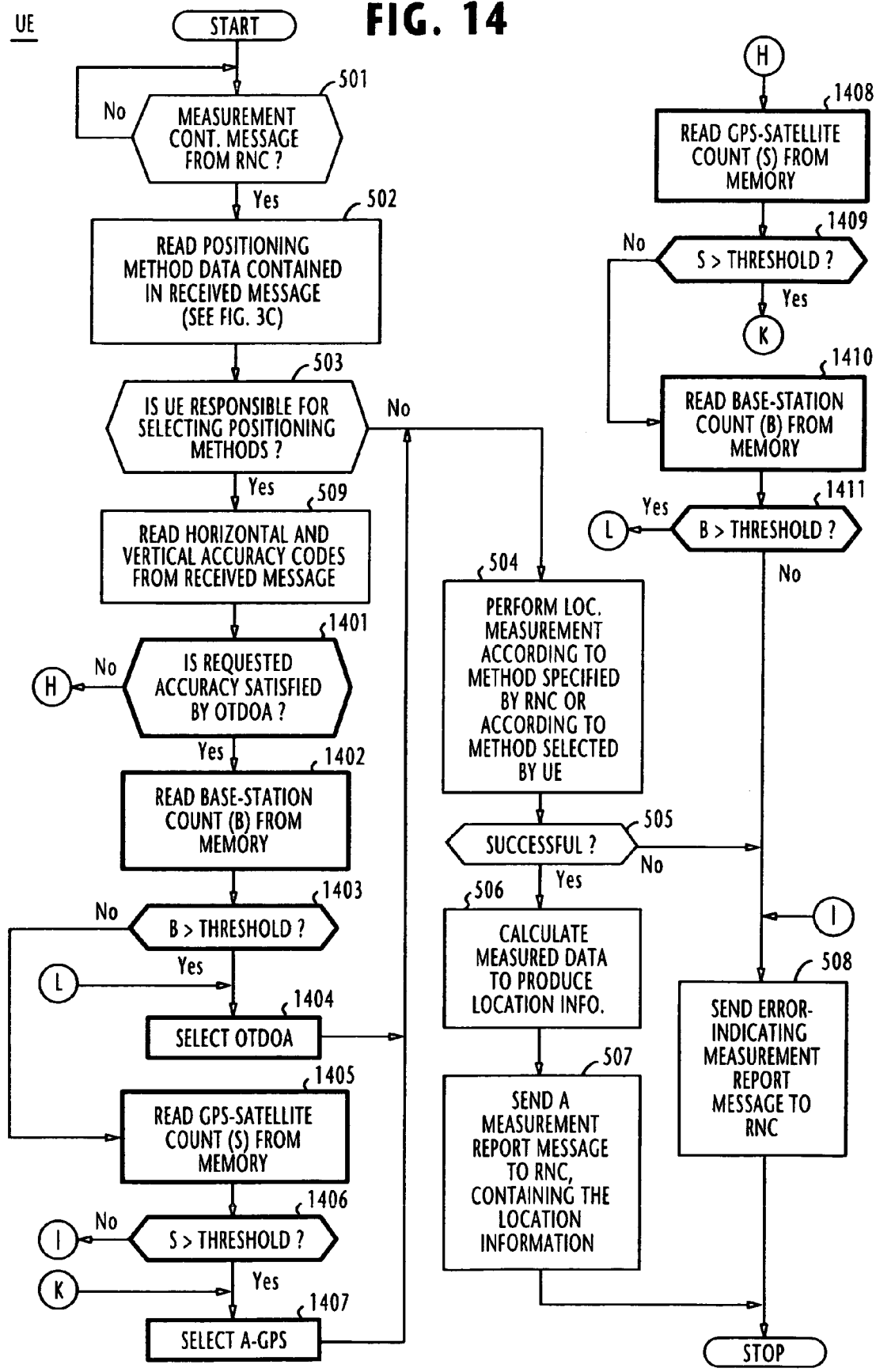
FIG. 14 is a flowchart of the operation of the UE terminal when the count number of base stations and the count number of observable GPS satellites are used for selecting a positioning method.

The overall operation of the location system according to the flowcharts of FIGS. 11 and 12 is shown in the sequence diagram of FIG. 13. When the location server receives a location request message from the client (event 1301), it initiates the application program (event 1302) to establish a virtual connection to the UE terminal and transmits a capability enquiry message to the UE terminal over the established connection (event 1303). The UE terminal responds to the enquiry message by initiating its application program (event 1304) and transmitting a capability reply message to the location server (event 1305). The location server transmits a copy of the client's location request message to the UE terminal (event 1306). If the location request message indicates that the UE terminal is responsible for selecting a positioning method, a positioning method selection is performed (event 1307), and if assistance data is required, the UE terminal transmits an assistance data request message to the location server (event 1308) and receives an assistance data delivery message from the location server (event 1309). The UE terminal performs measurement (event 1310) and position calculation (event 1311) and transmits a location report message to the location server (event 1312) and terminates its application program (event 1313). The location server repeats the received location report message to the client (event 1314) and terminates its application program (event 1315).

In the previous embodiments, horizontal and vertical accuracy codes requested by the client are used as a decision threshold for allowing the UE terminal to select a positioning method.

The following are modified embodiments of the operation of the UE terminal of FIG. 5 and are illustrated in FIGS. 14, 15, 16, 18, 20 and 21, in which parts corresponding to those of FIG. 5 are marked with the same numerals as those in FIG. 5 and the description thereof is omitted for simplicity.

In the following modifications, additional decision thresholds are used. These include the count number of observable GPS satellites and the count number of nearby base stations, the response time (waiting time requested by the client to receive a location report), the moving speed of the UE terminal and the distance traveled by the UE terminal. A further decision threshold is whether the UE terminal has a In FIG. 14, when the UE controller 126 retrieves the horizontal and vertical accuracy codes from the MC (measurement control) message received from the RNC 9 (step 509), it proceeds to decision step 1401 to check to see if the requested accuracy is satisfied by the OTDOA method. If the decision at step 1401 indicates that the requested accuracy is satisfied by the OTDOA method, flow proceeds to step 1402 to read the base-station count number (B) from the memory 125 and compares it with a decision threshold (step 1403). If the count number B is higher than the decision threshold, the UE controller selects the OTDOA method at step 1404 and proceeds to location measurement step 504.

If the decision at step 1403 indicates that the base-station count number B is lower than the threshold, the UE controller reads the GPS-satellite count number (S) from the memory 125 (step 1405) and compares it with a decision threshold (step 1406). If the satellite count number S is higher than the decision threshold, the UE controller selects the A-GPS method and proceeds to location measurement step 504. If the decision is negative at step 1406, flow proceeds to step 508 to send an error-indicating measurement report message to the RNC 9.

If the requested accuracy is not satisfied by the OTDOA method (step 1401), the UE controller proceeds to step 1408 to read the GPS-satellite count number S from the memory 125 and compares it with a decision threshold (step 1409). If the satellite count number S is higher than the decision threshold, the UE controller proceeds to step 1407 to select the A-GPS method and proceeds to location measurement step 504. If the comparison decision at step 1409 is negative, the UE controller proceeds to step 1410 to read the base-station count number B from the memory 125 and compares it with a decision threshold (step 1411). If the count number B is higher than the threshold, the UE controller selects the OTDOA method (step 1404) and proceeds to location measurement step 504. If the decision at step 1411 is negative, flow proceeds to step 508 to return an error-indicating measurement report to the RNC.

Figure 15:
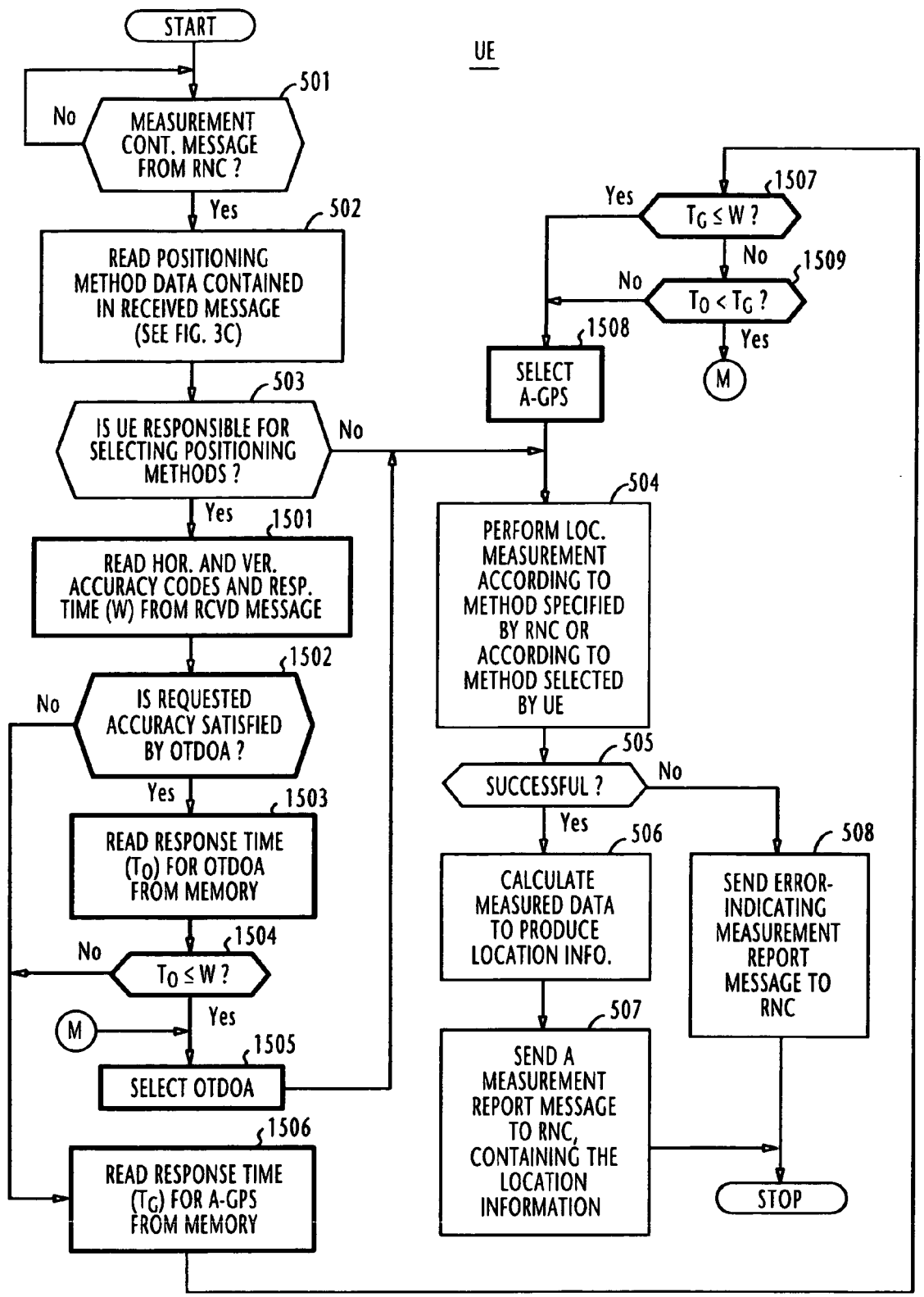
FIG. 15 is a flowchart of the operation of the UE terminal when the waiting time requested by the client terminal is used for selecting a positioning method.

In FIG. 15, when the UE controller 126 determines that it is reponsible for making a selection from positioning methods (step 503), it reads the horizontal and vertical accuracy codes and the requested response time "W" (waiting time) from the MC (measurement control) message received from the RNC 9 (step 1501), and proceeds to decision step 1502 to check to see if the requested horizontal and vertical accuracy is satisfied by the OTDOA method. If the decision at step 1502 indicates that the requested accuracy is satisfied by the OTDOA method, flow proceeds to step 1503 to read the response time ($T_O$) required for the OTDOA method from the memory 125 and compares it with the requested waiting time (step 1504). If the response time $T_O$ is equal to or smaller than the requested waiting time W, the UE controller selects the OTDOA method at step 1505 and proceeds to location measurement step 504.

If the decision at step 1504 indicates that the response time $T_O$ is equal to or smaller than the requested waiting time W, the UE controller reads the response time $T_G$ for the A-GPS method is from the memory 125 (step 1506) and compares it with the requested waiting time W (step 1507). If $T_G$ is equal to or smaller than W, the UE controller selects the A-GPS method (step 1508) and proceeds to location measurement step 504. If $T_G$ is greater than W, the response times $T_O$ and $T_G$ are compared with each other at step 1509. If $T_O$ is smaller than $T_G$, the OTDOA method is selected (step 1505). If $T_O$ is greater than $T_G$, the A-GPS method is selected (step 1508).

In FIG. 16, when the UE terminal determines that it is responsible for making a method selection (step 503), it proceeds to step 1601 to determine the UE's moving speed. In this embodiment, various moving speed values are mapped to usable positioning methods in a table 1701 as shown in FIG. 17.

At step 1602, the UE controller makes a search through the speed-method mapping table 1701 for detecting one or more methods corresponding to the determined moving speed. If such positioning methods are detected (step 1603), the UE controller selects one of the detected methods (step 1604) and proceeds to the location measurement step 504. If no corresponding method is found in the mapping table 1701 (step 1603), flow proceeds to step 508 to transmit an error-indicating measurement report to the RNC.

In FIG. 18, when the UE terminal determines that it is responsible for making a method selection (step 503), it proceeds to step 1801 to determine the UE's moving speed. In this embodiment, different positioning methods are mapped to their required response time values in a method-response table 1901 as shown in FIG. 19.

At step 1802, the UE controller reads all response time values from the mapping table 1901 and proceeds to step 1803 to use all these response time values and the determined moving speed of the UE terminal for estimating distances traveled by the UE for the respective positioning methods. At step 1804, the estimated distances are compared with the requested distance (i.e., the horizontal and vertical accuracy) and one or more methods are detected whose estimated distances are equal to smaller than the requested distance. If such methods are detected (step 1805), the UE controller selects one of these methods (step 1806) and proceeds to the location measurement step 504. If no method is detected, flow proceeds from step 1805 to step 508 to transmit an error-indicating measurement report to the RNC.

Figure 20:
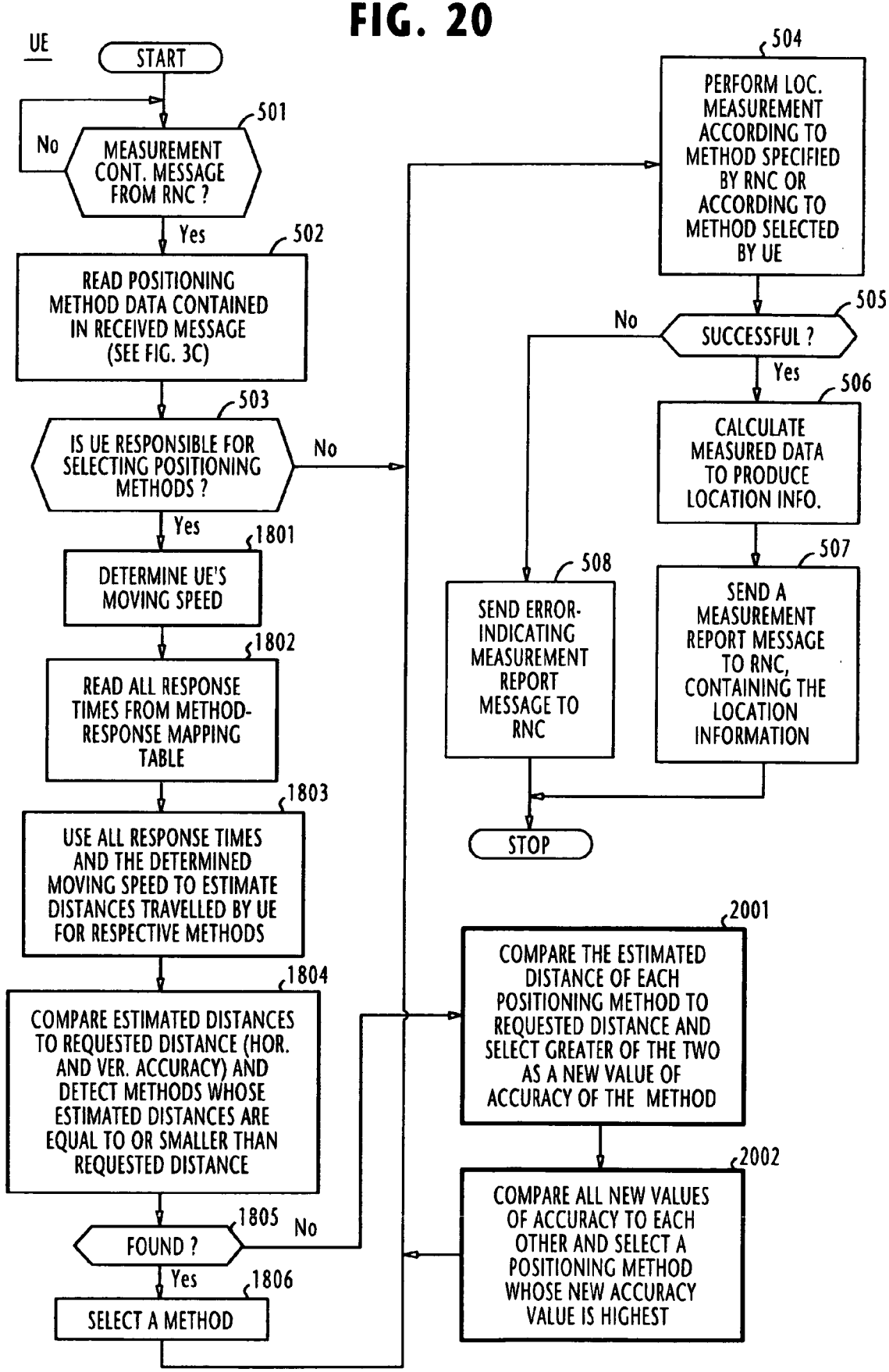
FIG. 20 is a flowchart of the operation of the UE terminal according to a modification of FIG. 18.

Instead of transmitting the error-indicating measurement report to the RNC, the UE terminal may includes steps 2001 and 2002 as shown in FIG. 20. When the UE controller determines, at step 1805, that there is no positioning method that satisfies the requested distance, it proceeds to step 2001 to compare the estimated distance of each positioning method to the requested distance and selects greater of the two as a new value of distance accuracy of the positioning method. At step 2002, the UE controller compares all new values of accuracy to each other and selects a positioning method whose new accuracy value is highest, and then proceeds to the location measurement step 504.

Figure 21:
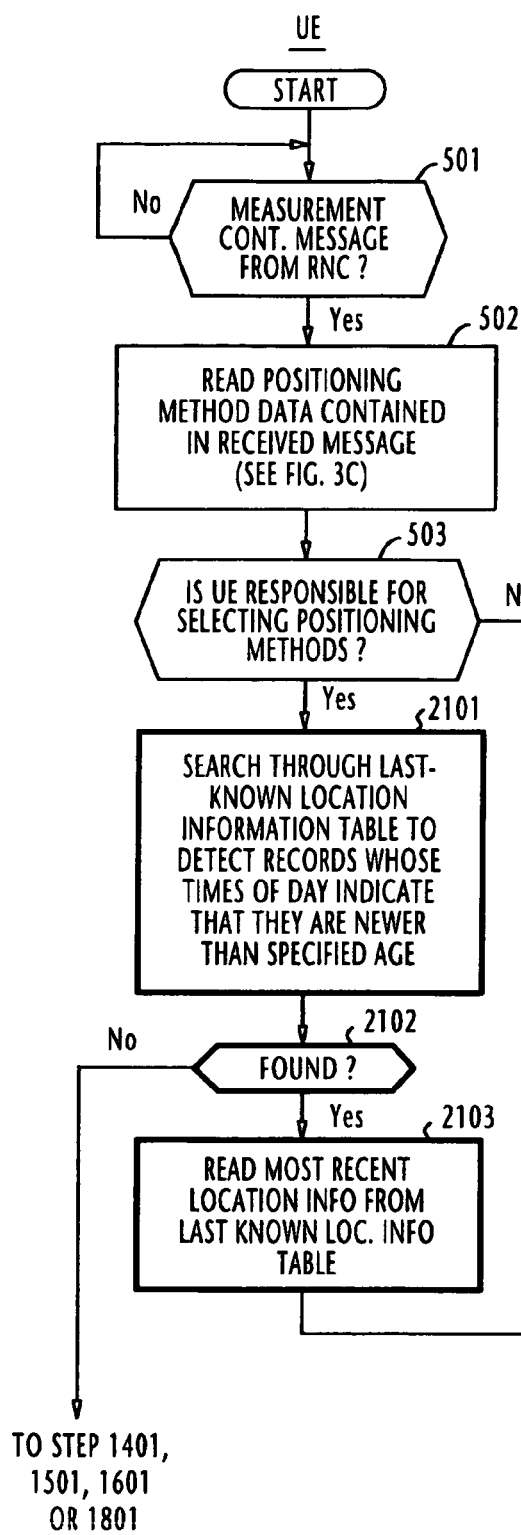
FIG. 21 is a flowchart of the operation of the UE terminal when past location information records are used.
Figure 22:
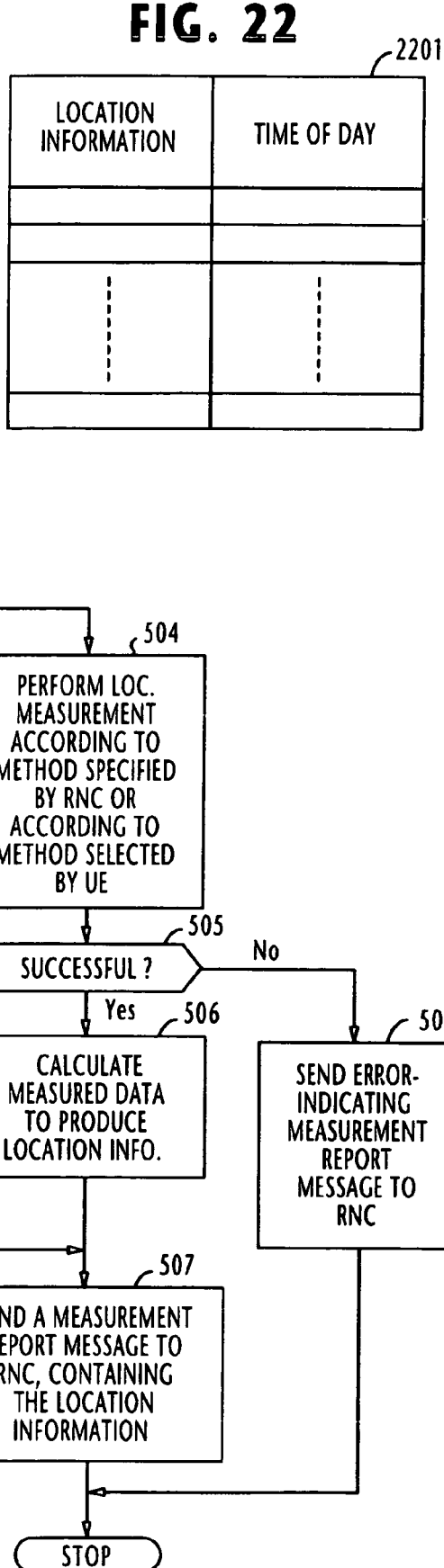
FIG. 22 is an illustration of a mapping table used by the UE terminal when operating according to FIG. 21.

In FIG. 21, the UE terminal uses a last known location info table 2201, shown in FIG. 22. In this table, previous location information of the UE terminal are mapped to their observed times of day.

When the UE terminal determines that it is responsible for making a method selection (step 503), it proceeds to step 2101 to make a search through the last known location info table 2201 for detecting records whose times of day indicate that they are newer than a specified past time point. If such previous location information is detected (step 2102), the UE terminal reads the most recent location information from the table 2201 (step 2103) and proceeds to step 507 to transmit a measurement report message to the RNC 9, containing the most recent location information. If the UE terminal fails to find such past records, it proceeds to one of steps 1401, 1501, 1601 or 1801.

What is claimed is:

1. A location system comprising:
   a mobile terminal capable of performing a plurality of positioning methods, said mobile terminal transmitting a registration message containing selectability information indicating whether the mobile terminal is capable of selecting said positioning methods;
   a client terminal that transmits a location request message that requests location information of said mobile terminal, said location information having requested accuracy;
   a plurality of wireless nodes for establishing a wireless link to said mobile terminal; and
   a controlling node connected to said wireless nodes for receiving said registration message from said mobile terminal, storing said selectabilitiy information, and receiving said location request message from said client terminal and examining said stored selectability information,
   wherein said controlling node transmits a control message that specifies said requested accuracy of location information to the mobile terminal if the examined selectability information indicates that the mobile terminal is capable of selecting said positioning methods;
   wherein said mobile terminal is responsive to said control message by selecting one of said positioning methods that satisfies the specific accuracy of location information specified in the control message, performs the selected positioning methods to produce measurement data, and transmits the measurement data to said controlling node.

2. The location system of claim 1,
   wherein said registration message further contains capability information that designates positioning methods supported by the mobile terminal, and
   wherein said controlling node is arranged to:
   transmit said control message as a first control message to said mobile terminal if the selectability information indicates that said mobile terminal is capable of selecting said positioning methods,
   store said capability information of the registration message;
   examine the stored capability information and the stored selectability information in response to receipt of said location request message from said client terminal
   select one of said position methods designated by said capability information tht satisfies said requested accuracy if the examiner selectability information indicates that the mobile terminal is not capable of selecting said positioning methods; and
   transmit a second control message to said mobile terminal, said second control message specifying the selected positioning method, and
   wherein said mobile terminal is responsive to said second control message for performing one of said positioning methods that is specified in the second control message to produce measurement data and transmit the measurement data to said controlling node.

3. The location system of claim 2, wherein said controlling node comprises a memory and is arranged to:
   map the transmitted capability information to identity of said mobile terminal in said memory,
   read the capability information corresponding to said mobile terminal in response to said location request message, and
   transmit said first control message or said second control message depending on the read capability information.

4. The location system of claim 2, wherein said mobile terminal is arranged to acquire assistance data from said controlling node and use the acquired assistance data to produce said measurement data.

5. The location system of claim 4, wherein said assistance data is one of mobile-assisted OTDOA assistance data, mobile-based OTDOA assistance data, mobile-based A-GPS assistance data, and mobile-assisted A-GPS assistance data.

6. The location system of claim 2, wherein said mobile terminal is arranged to calculate said measurement data to produce location information of the mobile terminal and transmit the location information to said controlling node.

7. The location system of claim 2, wherein said mobile terminal is arranged to find an available positioning method if said measurement data is not successfully obtained and select one of the location processors corresponding to the available positioning method.

8. The location system of claim 2, wherein said controlling node is a radio network controller of a radio access network which is connected to a core network including a location gateway and a serving node.

9. The location system of claim 2, wherein said controlling node is a location server external to a core network including a location gateway and a serving node, said location server being connected to said base stations via a radio network controller of a radio access network to which said core network is connected.

10. The location system of claim 9, wherein said location server is arranged to:
    transmit an enquiry message to said mobile terminal in response to said location request message from said client terminal,
    receive a reply message from said mobile terminal containing said capability information and said selectability information of the mobile terminal,
    examine said capability information and said selectability information; and
    transmit said first or second control message to said mobile terminal depending on the examined capability information and the examined selectability information.

11. The location system of claim 2, wherein said mobile terminal is arranged to:
    determine if OTDOA positioning method is satisfactory for the requested accuracy, if the OTDOA positioning method is satisfactory for the requested accuracy, compare a count number of base stations observable from the mobile terminal to a first predetermined number, if said count number is greater than said first predetermined number, select said OTDOA positioning method, if said count number is smaller than said predetermined number, compare a count number of GPS satellites observable from said mobile terminal to a second predetermined number, and if the count number of said GPS satellites is greater than the second predetermined number, select A-GPS positioning method.

12. The location system of claim 11, wherein said mobile terminal is arranged to:

compare the count number of observable GPS satellites to said second predetermined number if the OTDOA positioning method is not satisfactory for the requested accuracy, if the count number of said GPS satellites is greater than the second predetermined number, select A-GPS positioning method, if the count number of said GPS satellites is smaller than the second predetermined number, compare the count number of said observable base stations to said first predetermined number, if said count number of said observable base stations is greater than the first predetermined number, select the OTDOA positioning method, and if said count number of said observable base stations is smaller than the first predetermined number, transmit an error-indicating report to said controlling node.

13. The location system of claim 12, wherein said mobile terminal includes a memory for storing past records of location information of the mobile terminal, and is further arranged to:

search through the memory for detecting records which are newer than a specified age, and select a most recent record from said detected records as location information of the mobile terminal.

14. The location system of claim 11, wherein said mobile terminal includes a memory for storing past records of location information of the mobile terminal, and is further arranged to:

search through the memory for detecting records which are newer than a specified age, and select a most recent record from said detected records as location information of the mobile terminal.

15. The location system of claim 2, wherein said location request message contains a requested waiting time, wherein said mobile terminal is arranged to:

determine if OTDOA positioning method is satisfactory for the requested accuracy, if the OTDOA positioning method is satisfactory for the requested accuracy, compare response time of the OTDOA positioning method to the requested waiting time of said location request message, if the response time of the OTDOA positioning method is equal to or smaller than the requested waiting time, select the OTDOA positioning method, if the OTDOA positioning method is not satisfactory for the requested accuracy or the response time of said OTDOA positioning method is greater than said requested waiting time, compare response time of A-GPS positioning method to the requested waiting time of said location request message, and if the response time of the A-GPS positioning method is equal to or smaller than the requested waiting time, select the A-GPS positioning method.

16. The location system of claim 15, wherein the mobile terminal is arranged to:

compare the response time of the OTDOA positioning method to the response time of the A-GPS positioning method if the response time of the A-GPS positioning method is greater than the requested waiting time, and if the response time of the OTDOA positioning method is greater than the response time of the A-GPS positioning method, select the OTDOA positioning method.

17. The location system of claim 16, wherein said mobile terminal includes a memory for storing past records of location information of the mobile terminal, and is further arranged to:

search through the memory for detecting records which are newer than a specified age, and select a most recent record from said detected records as location information of the mobile terminal.

18. The location system of claim 15, wherein said mobile terminal includes a memory for storing past records of location information of the mobile terminal, and is further arranged to:

search through the memory for detecting records which are newer than a specified age, and select a most recent record from said detected records as location information of the mobile terminal.

19. The location system of claim 2, wherein said mobile terminal includes a table for mapping a plurality of moving speeds to usable positioning methods, said mobile terminal is arranged to:

detect a moving speed of said mobile terminal, search through said table for detecting positioning methods corresponding to the detected moving speed, and select one of the detected positioning methods.

20. The location system of claim 19, wherein said mobile terminal includes a memory for storing past records of location information of the mobile terminal, and is further arranged to:

search through the memory for detecting records which are newer than a specified age, and select a most recent record from said detected records as location information of the mobile terminal.

21. The location system of claim 2, wherein said mobile terminal is arranged to:

detect a moving speed of said mobile terminal, estimate a plurality of distances travelled by the mobile terminal from the detected moving speed and respective response times of said positioning methods, compare said estimated distances to the requested distance represented by said accuracy, and select one of said estimated distances which are equal to or smaller than the requested distance and select one of said positioning methods which corresponds to the selected distance.

22. The location system of claim 21, wherein said mobile terminal is further arranged to:

compare, for each of said positioning methods, the estimated distance to said requested distance if none of said estimated distances is equal to or smaller than the requested distance, select greater of the estimated distance and the requested distance as a new value of accuracy of the positioning method, and select one of said positioning methods whose new value of accuracy is highest of all of the positioning methods.

23. The location system of claim 21, wherein said mobile terminal includes a memory for storing past records of location information of the mobile terminal, and is further arranged to:
  search through the memory for detecting records which are newer than a specified age, and
  select a most recent record from said detected records as location information of the mobile terminal.

24. The location system of claim 1, wherein said controlling node is arranged to:
  determine whether a cell-identity positioning method is satisfactory for the requested accuracy,
  detect identity of a cell in which the mobile terminal is located if the cell-identity positioning method is satisfactory for the requested accuracy, and
  translate the cell identity to location information of said mobile terminal; and
  transmit said control message specifying the requested accuracy to said mobile terminal if the cell-identity positioning method is not satisfactory for the reciuested accuracy and the examined selectability information indicates that said mobile terminal is capable of selecting said positioning methods.

25. A locating method by using a mobile communication network, the network comprising a mobile terminal capable of performing a plurality of positioning methods, a plurality of wireless nodes for establishing a wireless link to said mobile terminal, a client terminal that transmits a location request message that rquests location information of the mobile terminal, said location information having requested accuracy; and a controlling node connected to said wireless nodes, the method comprising the steps of:
  transmitting, from said mobile terminal, a registration message containing selectability information indicating whether the mobile terminal is capable of selecting said positioning methods;
  receiving, at said controlling node, said registration message from said mobile terminal and storing said selectability information;
  receiving, at said controlling node, said location requested message from said client terminal and examining stored selectability information of the mobile terminal;
  transmitting, from said controlling node, a control message that specifies the requested accuracy of location information;
  receving, at said mobile terminal, said control message;
  selecting, at said mobile terminal, one of said positioning methods that satisfies the requested accuracy of location information specified in the control message and performing the selected method to produce measurement data; and
  transmitting said measurement data to said controlling node.

26. The locating method of claim 25, wherein said registration message further contains capability information that designates positioning methods supported by the mobile terminal, further comprising the steps of:
  storing, in said controlling node, said capability information of the registration message;
  examining the stored capability information and the stored selectability information in response to receipt of said location request message from said client terminal
  transmitting, from said controlling node, said control message as a first control message to said mobile terminal if the examined selectability information indicates that said mobile terminal is capable of selecting said positioning methods;
  selecting one of said positioning methods desigtnated by said capability information that satisfies said requested accuracy if the examined selectability information indicates that the mobile terminal is not capable of selecting said positioning methods;
  transmitting, from said controlling node, a second control message to said mobile terminal if the capability information indicates that said mobile terminal is not capable of selecting positioning methods, said second control message specifying one of said positioning methods supported by said mobile terminal;
  performing, at said mobile terminal, the positioning method which is specified in the second control message to measurement data; and
  transmitting the measurement data to said controlling node.

27. The locating method of claim 26, wherein said controlling node comprises a memory, further comprising the steps of:
  mapping, at said controlling node, the transmitted capability information to identity of said mobile terminal in said memory,
  reading the capability information corresponding to identity of said mobile terminal in response to said location request message, and
  transmitting said first control message or said second control message depending on the read capability information.

28. The locating method of claim 26, further comprising the steps of acquiring, at said mobile terminal, assistance data from said controlling node and using the acquired assistance data to produce said measurement data.

29. The locating method of claim 28, wherein said assistance data is one of mobile-assisted OTDOA assistance data, mobile-based OTDOA assistance data, mobile-based A-GPS assistance data, and mobile-assisted A-GPS assistance data.

30. The locating method of claim 26, further comprising the steps of calculating said measurement data to produce location information of the mobile terminal and transmitting the location information to said controlling node.

31. The locating method of claim 26, further comprising the steps of finding an available positioning method if said measurement data is not successfully obtained and selecting one of the location processors corresponding to the available positioning method.

32. The locating method of claim 26, wherein said controlling node is a radio network controller of a radio access network which is connected to a core network including a location gateway and a serving node.

33. The locating method of claim 26, wherein said controlling node is a location server external to a core network including a location gateway and a serving node, said location server being connected to said base stations via a radio network controller of a radio access network to which said core network is connected.

34. The locating method of claim 33, further comprising the steps of:
  transmitting an enquiry message from said location server to said mobile terminal in response to said location request message from said client terminal,
  receiving a reply message from said mobile terminal containing said capability information and said selectability information of the mobile terminal,
  examining said capability information and said selectability information, and
  transmitting said first or second control message to said mobile terminal depending on the examined capability information and the examined selectability information contained in said reply message.

35. The locating method of claim 26, further comprising the steps of:
   a) determining, at said mobile terminal, if OTDOA positioning method is satisfactory for the requested accuracy;
   b) if the OTDOA positioning method is satisfactory for the requested accuracy, comparing a count number of base stations observable from the mobile terminal to a first predetermined number;
   c) if said count number is greater than said first predetermined number, selecting said OTDOA positioning method;
   d) if said count number is smaller than said predetermined number, comparing a count number of GPS satellites observable from said mobile terminal to a second predetermined number; and
   e) if the count number of said GPS satellites is greater than the second predetermined number, selecting A-GPS positioning method.

36. The locating method of claim 35, further comprising the steps of:
   f) comparing the count number of observable GPS satellites to said second predetermined number if the OTDOA positioning method is not satisfactory for the requested accuracy;
   g) if the count number of said GPS satellites is greater than the second predetermined number, selecting A-GPS positioning method;
   h) if the count number of said GPS satellites is smaller than the second predetermined number, comparing the count number of said observable base stations to said first predetermined number,
   i) if said count number of said observable base stations is greater than the first predetermined number, selecting the OTDOA positioning method, and
   j) if said count number of said observable base stations is smaller than the first predetermined number, transmitting an error-indicating report to said controlling node.

37. The locating method of claim 36, wherein said mobile terminal includes a memory for storing past records of location information of the mobile terminal, further comprising the steps of:
   before performing step (a), making a search through the memory for detecting records which are newer than a specified age;
   selecting a most recent record from said detected records as location information of the mobile terminal; and
   if none of said past records is newer than the specified age, proceeding to step (a).

38. The locating method of claim 35, wherein said mobile terminal includes a memory for storing past records of location information of the mobile terminal, further comprising the steps of:
   before performing step (a), making a search through the memory for detecting records which are newer than a specified age;
   selecting a most recent record from said detected records as location information of the mobile terminal; and
   if none of said past records is newer than the specified age, proceeding to step (a).

39. The locating method of claim 26, wherein said location request message contains a requested waiting time, further comprising the steps of:
   a) determining, at said mobile terminal, whether OTDOA positioning method is satisfactory for the requested accuracy;
   b) if the OTDOA positioning method is satisfactory for the requested accuracy, compare response time of the OTDOA positioning method to the requested waiting time of said location request message;
   c) if the response time of the OTDOA positioning method is equal to or smaller than the requested waiting time, selecting the OTDOA positioning method;
   d) if the OTDOA positioning method is not satisfactory for the requested accuracy or the response time of said OTDOA positioning method is greater than said requested waiting time, comparing response time of A-GPS positioning method to the requested waiting time of said location request message; and
   e) if the response time of the A-GPS positioning method is equal to or smaller than the requested waiting time, selecting the A-GPS positioning method.

40. The locating method of claim 39, further comprising the steps of:
   f) comparing the response time of the OTDOA positioning method to the response time of the A-GPS positioning method if the response time of the A-GPS positioning method is greater than the requested waiting time, and
   g) if the response time of the OTDOA positioning method is greater than the response time of the A-GPS positioning method, selecting the OTDOA positioning method.

41. The locating method of claim 40, wherein said mobile terminal includes a memory for storing past records of location information of the mobile terminal, further comprising the steps of:
   before performing step (a), making a search through the memory for detecting records which are newer than a specified age;
   selecting a most recent record from said detected records as location information of the mobile terminal; and
   if none of said past records is newer than the specified age, proceeding to step (a).

42. The locating method of claim 39, wherein said mobile terminal includes a memory for storing past records of location information of the mobile terminal, further comprising the steps of:
   before performing step (a), making a search through the memory for detecting records which are newer than a specified age;
   selecting a most recent record from said detected records as location information of the mobile terminal; and
   if none of said past records is newer than the specified age, proceeding to step (a).

43. The locating method of claim 26, wherein said mobile terminal includes a table for mapping a plurality of moving speeds to usable positioning methods, further comprising the steps of:
   detecting, at said mobile terminal, a moving speed of the mobile terminal;
   making a search through said table for detecting positioning methods corresponding to the detected moving speed; and
   selecting one of the detected positioning methods.

44. The locating method of claim 43, wherein said mobile terminal includes a memory for storing past records of location information of the mobile terminal, further comprising the steps of:

before performing step (a), making a search through the memory for detecting records which are newer than a specified age;

selecting a most recent record from said detected records as location information of the mobile terminal; and if none of said past records is newer than the specified age, proceeding to step (a).

45. The locating method of claim 26, further comprising the steps of:

detecting, at said mobile terminal, a moving speed of said mobile terminal;

estimating a plurality of distances travelled by the mobile terminal from the detected moving speed and respective response times of said positioning methods;

comparing said estimated distances to the requested distance represented by said accuracy; and selecting one of said estimated distances which are equal to or smaller than the requested distance and select one of said positioning methods which corresponds to the selected distance.

46. The locating method of claim 45, further comprising the steps of:

comparing, for each of said positioning methods, the estimated distance to said requested distance if none of said estimated distances is equal to or smaller than the requested distance;

selecting greater of the estimated distance and the requested distance as a new value of accuracy of the positioning method; and selecting one of said positioning methods whose new value of accuracy is highest of all of the positioning methods.

47. The locating method of claim 46, wherein said mobile terminal includes a memory for storing past records of location information of the mobile terminal, further comprising the steps of:

before performing step (a), making a search through the memory for detecting records which are newer than a specified age;

selecting a most recent record from said detected records as location information of the mobile terminal; and if none of said past records is newer than the specified age, proceeding to step (a).

48. The locating method of claim 45, wherein said mobile terminal includes a memory for storing past records of location information of the mobile terminal, further comprising the steps of:

before performing step (a), making a search through the memory for detecting records which are newer than a specified age;

selecting a most recent record from said detected records as location information of the mobile terminal; and if none of said past records is newer than the specified age, proceeding to step (a).

49. The locating method of claim 25, further comprising the steps of:

determining, at said controlling node, whether a cell-identity positioning method is satisfactory for the requested accuracy, detecting identity of a cell in which the mobile terminal is located if the cell-identity positioning method is satisfactory for the requested accuracy, and translating the cell identity to location information of said mobile terminal; and transmitting, from said controlling node, said control message specifying the requested accuracy to said mobile terminal if the cell-identity positioning method is not satisfactory for the requested accuracy and the examined selectability information indicates that said mobile terminal is capable of selecting said positioning methods.

50. A mobile terminal for a cellular communication network, comprising:

a plurality of location processors for performing a plurality of positioning methods, respectively; and control means for (a) transmitting, to said network, a registration message containing selectability information indicating whether the mobile terminal is capable of selecting said positioning methods, (b) receiving a first control message from said network indicating that the mobile terminal is responsible for selecting positioning methods and containing accuracy of location information of the mobile terminal requested by a client terminal, (c) selecting one of said positioning methods that satisfies the requested accuracy, (d) receiving a second control message from said network specifying one of said positioning methods, (e) selecting the positioning method specified in the second control message, (f) operating one of said location processor that operates the selected positioning method to produce measurement data, and (g) transmitting the measurement data to said controlling node.

51. The mobile terminal of claim 50, wherein said control means is arranged to acquire assistance data from said network and use the assistance data to produce said measurement data.

52. The mobile terminal of claim 51, wherein said assistance data is one of mobile-assisted OTDOA assistance data, mobile-based OTDOA assistance data, mobile-based A-GPS assistance data, and mobile-assisted A-GPS assistance data.

53. The mobile terminal of claim 50, wherein said control means is arranged to calculate said measurement data to produce location information of the mobile terminal and transmit the location information to said network.

54. The mobile terminal of claim 50, wherein said control means is arranged to find an available positioning method if said measurement data is not successfully obtained and operate one of the location processors corresponding to the available positioning method.

55. The mobile terminal of claim 50, wherein said control means is arranged to:

determine if OTDOA positioning method is satisfactory for the requested accuracy, if the OTDOA positioning method is satisfactory for the requested accuracy, compare a count number of base stations observable from the mobile terminal to a first predetermined number, if said count number is greater than said first predetermined number, select said OTDOA positioning method, if said count number is smaller than said predetermined number, compare a count number of GPS satellites observable from said mobile terminal to a second predetermined number, and if the count number of said GPS satellites is greater than the second predetermined number, select A-GPS positioning method.

56. The mobile terminal of claim 55, wherein said mobile terminal includes a memory for storing past records of location information of the mobile terminal, and is further arranged to:

search through the memory for detecting records which are newer than a specified age, and select a most recent record from said detected records as location information of the mobile terminal.

57. The mobile terminal of claim 50, wherein said control means is arranged to:
compare the count number of observable GPS satellites to said second predetermined number if the OTDOA positioning method is not satisfactory for the requested accuracy,
if the count number of said GPS satellites is greater than the second predetermined number, select A-GPS positioning method,
if the count number of said GPS satellites is smaller than the second predetermined number, compare the count number of said observable base stations to said first predetermined number,
if said count number of said observable base stations is greater than the first predetermined number, select the OTDOA positioning method, and
if said count number of said observable base stations is smaller than the first predetermined number, transmit an error-indicating report to said controlling node.

58. The mobile terminal of claim 57, wherein said mobile terminal includes a memory for storing past records of location information of the mobile terminal, and is further arranged to:
search through the memory for detecting records which are newer than a specified age, and
select a most recent record from said detected records as location information of the mobile terminal.

59. The mobile terminal of claim 50, wherein said first control message contains a requested waiting time, wherein said control means is arranged to:
determine if OTDOA positioning method is satisfactory for the requested accuracy,
if the OTDOA positioning method is satisfactory for the requested accuracy, compare response time of the OTDOA positioning method to the requested waiting time of said location request message,
if the response time of the OTDOA positioning method is equal to or smaller than the requested waiting time, select the OTDOA positioning method,
if the OTDOA positioning method is not satisfactory for the requested accuracy or the response time of said OTDOA positioning method is greater than said requested waiting time, compare response time of A-GPS positioning method to the requested waiting time of said location request message, and
if the response time of the A-GPS positioning method is equal to or smaller than the requested waiting time, select the A-GPS positioning method.

60. The mobile terminal of claim 59, wherein the control means is arranged to:
compare the response time of the OTDOA positioning method to the response time of the A-GPS positioning method if the response time of the A-GPS positioning method is greater than the requested waiting time, and
if the response time of the OTDOA positioning method is greater than the response time of the A-GPS positioning method, select the OTDOA positioning method.

61. The mobile terminal of claim 60, wherein said mobile terminal includes a memory for storing past records of location information of the mobile terminal, and is further arranged to:
search through the memory for detecting records which are newer than a specified age, and
select a most recent record from said detected records as location information of the mobile terminal.

62. The mobile terminal of claim 59, wherein said mobile terminal includes a memory for storing past records of location information of the mobile terminal, and is further arranged to:
search through the memory for detecting records which are newer than a specified age, and
select a most recent record from said detected records as location information of the mobile terminal.

63. The mobile terminal of claim 50, further comprising a table for mapping a plurality of moving speeds to usable positioning methods, wherein said control means is arranged to:
detect a moving speed of said mobile terminal,
search through said table for detecting positioning methods corresponding to the detected moving speed, and
select one of the detected positioning methods.

64. The mobile terminal of claim 63, wherein said mobile terminal includes a memory for storing past records of location information of the mobile terminal, and is further arranged to:
search through the memory for detecting records which are newer than a specified age, and
select a most recent record from said detected records as location information of the mobile terminal.

65. The mobile terminal of claim 50, wherein said control means is arranged to:
detect a moving speed of said mobile terminal,
estimate a plurality of distances travelled by the mobile terminal from the detected moving speed and respective response times of said positioning methods,
compare said estimated distances to the requested distance represented by said accuracy, and
select one of said estimated distances which are equal to or smaller than the requested distance and select one of said positioning methods which corresponds to the selected distance.

66. The mobile terminal of claim 65, wherein said control means is further arranged to:
compare, for each of said positioning methods, the estimated distance to said requested distance if none of said estimated distances is equal to or smaller than the requested distance,
select greater of the estimated distance and the requested distance as a new value of accuracy of the positioning method, and
select one of said positioning methods whose new value of accuracy is highest of all of the positioning methods.

67. The mobile terminal of claim 66, wherein said mobile terminal includes a memory for storing past records of location information of the mobile terminal, and is further arranged to:
search through the memory for detecting records which are newer than a specified age, and
select a most recent record from said detected records as location information of the mobile terminal.

68. The mobile terminal of claim 65, wherein said mobile terminal includes a memory for storing past records of location information of the mobile terminal, and is further arranged to:
search through the memory for detecting records which are newer than a specified age, and
select a most recent record from said detected records as location information of the mobile terminal.

* * * * *

UNITED STATES PATENT AND TRADEMARK OFFICE
CERTIFICATE OF CORRECTION

| | | |
|---|---|---|
| PATENT NO. | : 7,376,430 B2 | Page 1 of 1 |
| APPLICATION NO. | : 10/762541 | |
| DATED | : May 20, 2008 | |
| INVENTOR(S) | : Matsuda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this
Eleventh Day of January, 2011

David J. Kappos
*Director of the United States Patent and Trademark Office*